United States Patent
Mizutani

(10) Patent No.: US 10,379,423 B2
(45) Date of Patent: Aug. 13, 2019

(54) IMAGE-CAPTURING APPARATUS

(71) Applicant: CANON KABUSHIKI KAISHA, Tokyo (JP)

(72) Inventor: Shoma Mizutani, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/869,440

(22) Filed: Jan. 12, 2018

(65) Prior Publication Data

US 2018/0203330 A1 Jul. 19, 2018

(30) Foreign Application Priority Data

Jan. 16, 2017 (JP) ................................. 2017-004767
Jan. 16, 2017 (JP) ................................. 2017-004768
Jan. 16, 2017 (JP) ................................. 2017-004769

(51) Int. Cl.
*G03B 15/05* (2006.01)
(52) U.S. Cl.
CPC ...... *G03B 15/05* (2013.01); *G03B 2215/0507* (2013.01)
(58) Field of Classification Search
CPC . G03B 15/05; G03B 15/0431; G03B 15/0436
USPC ........................................................ 396/177
See application file for complete search history.

(56) References Cited

U.S. PATENT DOCUMENTS

| | | | | |
|---|---|---|---|---|
| 5,194,885 A | * | 3/1993 | Spencer | G03B 15/05 396/182 |
| 5,245,374 A | * | 9/1993 | Hosokawa | G03B 15/05 396/177 |
| 6,222,997 B1 | * | 4/2001 | Ebe | G03B 15/05 396/177 |
| 6,542,697 B1 | * | 4/2003 | Yamamoto | G03B 15/03 396/177 |
| 8,827,471 B2 | * | 9/2014 | Mitani | G03B 15/03 362/253 |
| 2003/0223741 A1 | * | 12/2003 | Yagi | G03B 15/05 396/178 |
| 2017/0351160 A1 | * | 12/2017 | Ichihara | G03B 7/16 |

FOREIGN PATENT DOCUMENTS

JP 2006-078506 A 3/2006
JP 2014-006303 A 1/2014

* cited by examiner

*Primary Examiner* — Clayton E. LaBalle
*Assistant Examiner* — Linda B Smith
(74) *Attorney, Agent, or Firm* — Carter, DeLuca & Farrell LLP

(57) ABSTRACT

The image-capturing apparatus includes a light-emitting unit movable between a retracted position and a light-emitting position at which a light emitter faces a direction different from an image-capturing direction toward an object, and a moving mechanism to rotate the light-emitting unit about a rotation center axis not parallel to the image-capturing direction to move the light-emitting unit between the retracted and light-emitting positions. The moving mechanism is configured such that, at the retracted position, the light emitter is located on an object side further than the rotation center axis located at a first position, and such that, at the light-emitting position, the rotation center axis is located at a second position located on the object side further than the first position. The moving mechanism includes a stopper portion provided to stop the rotation center axis at the second position.

20 Claims, 24 Drawing Sheets

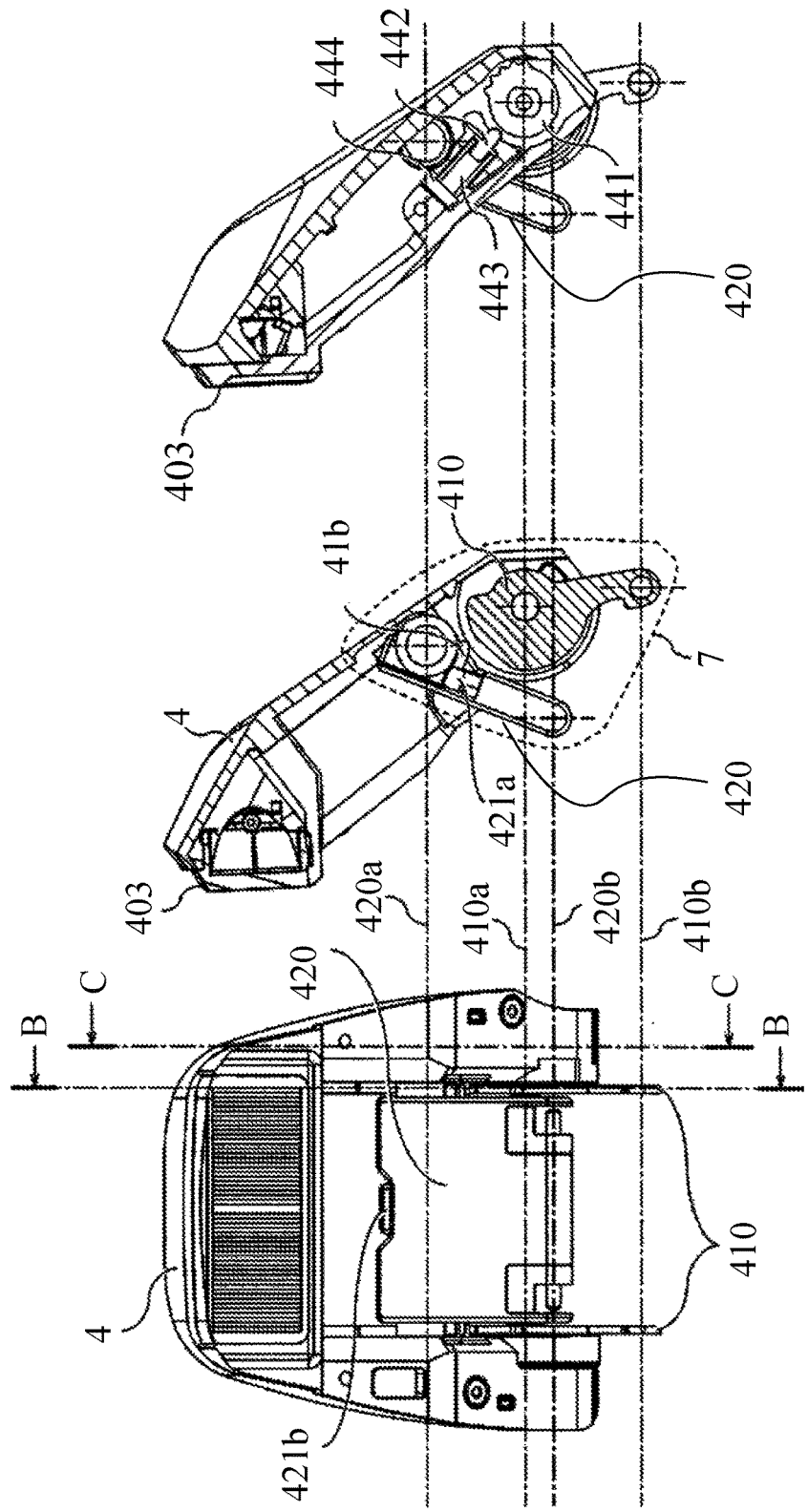

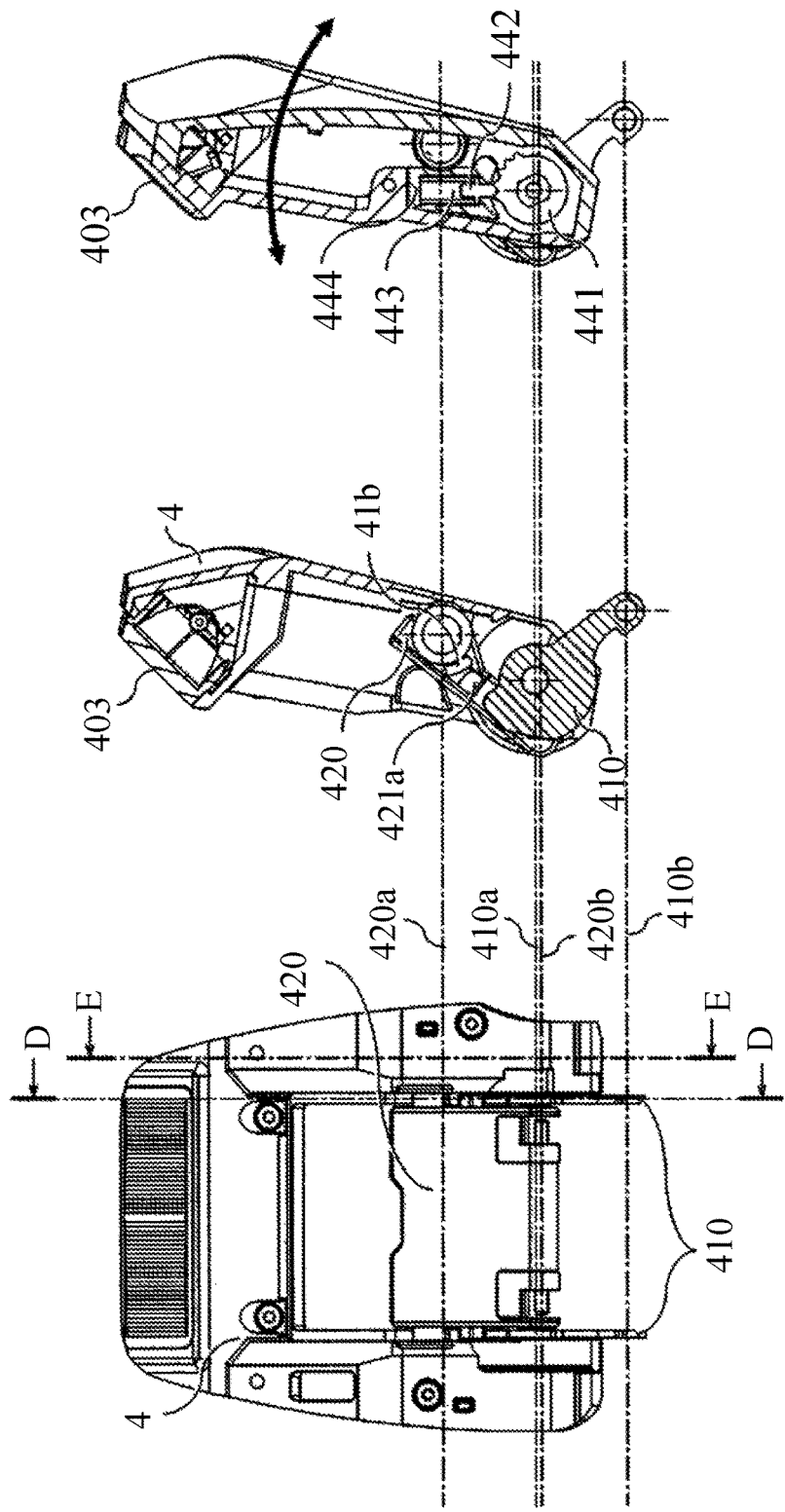

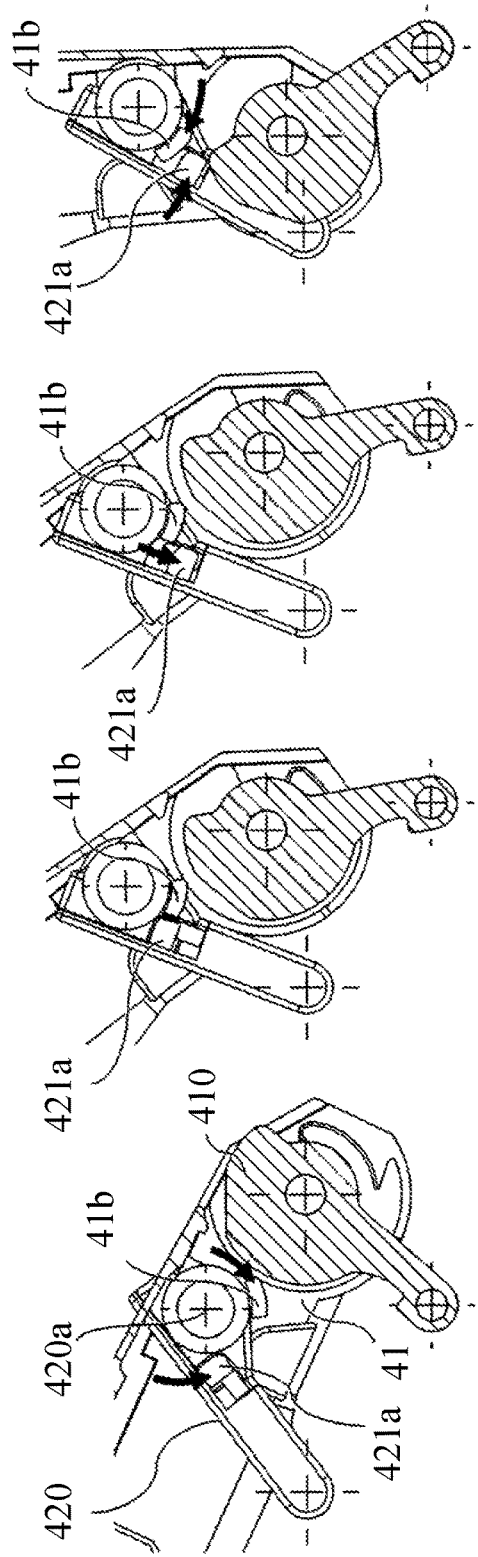

FIG. 12A
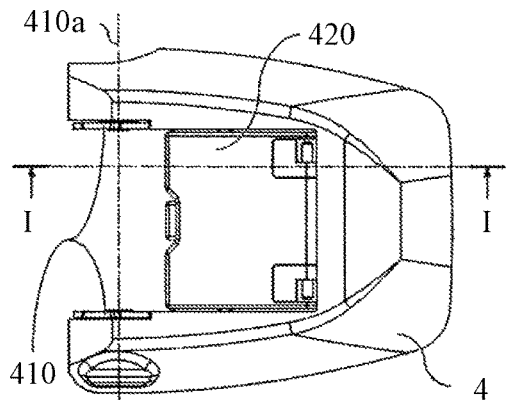
FIG. 12B
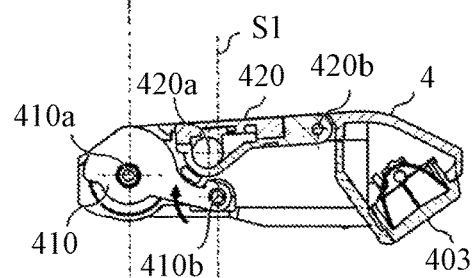
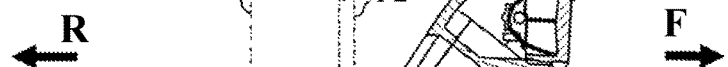
FIG. 12C
FIG. 12D
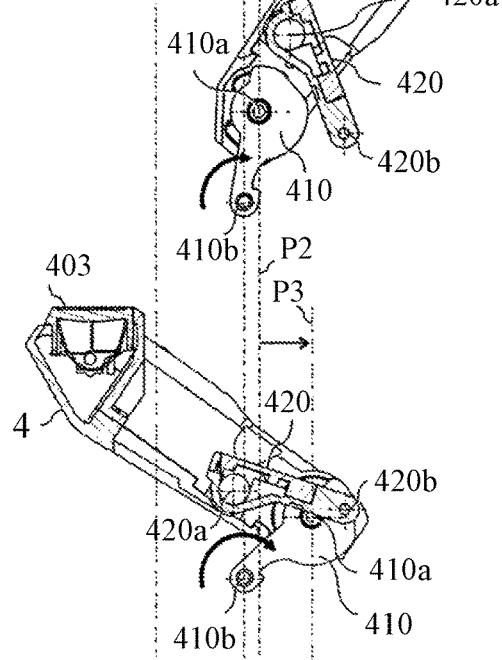

R ← → F

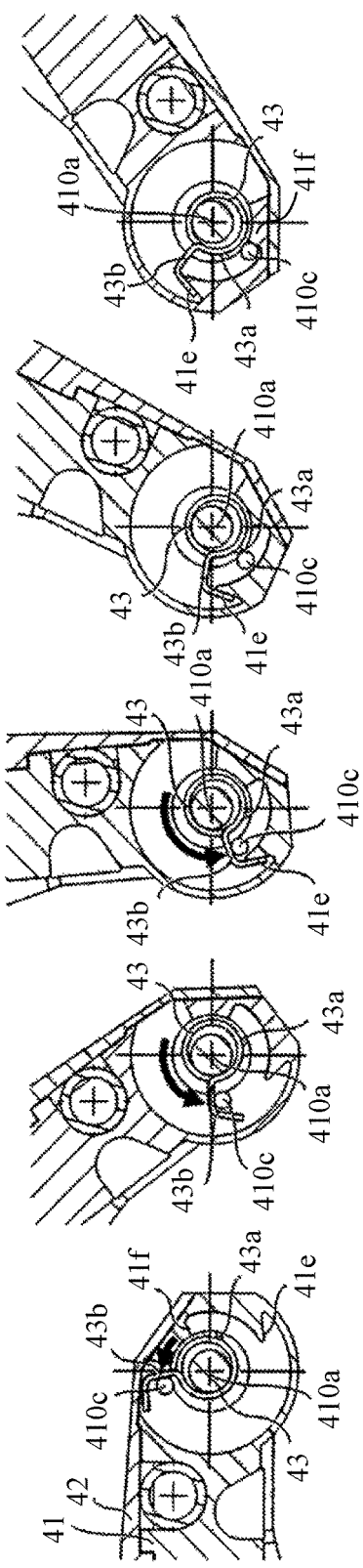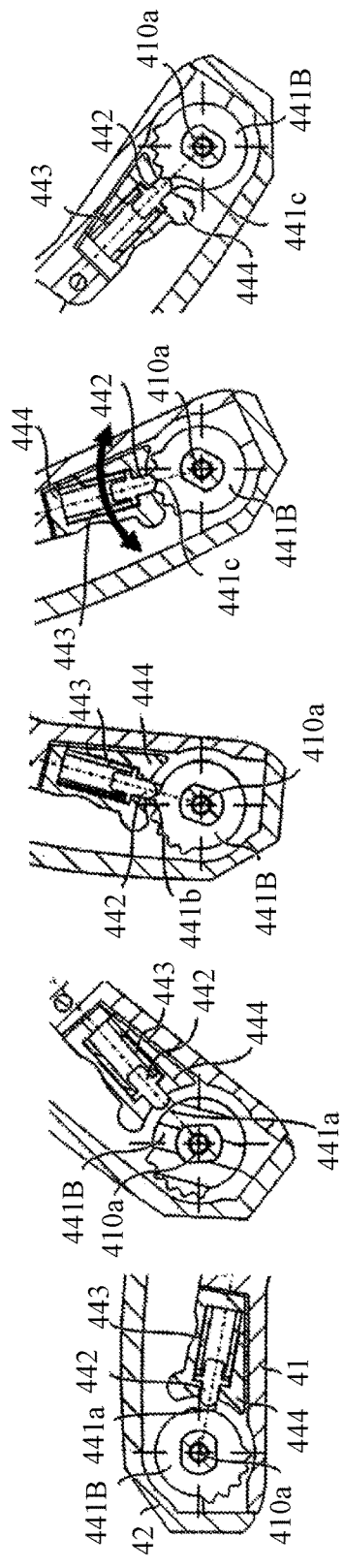

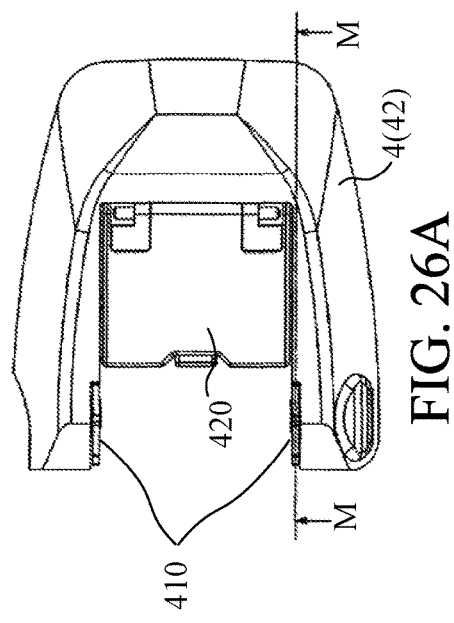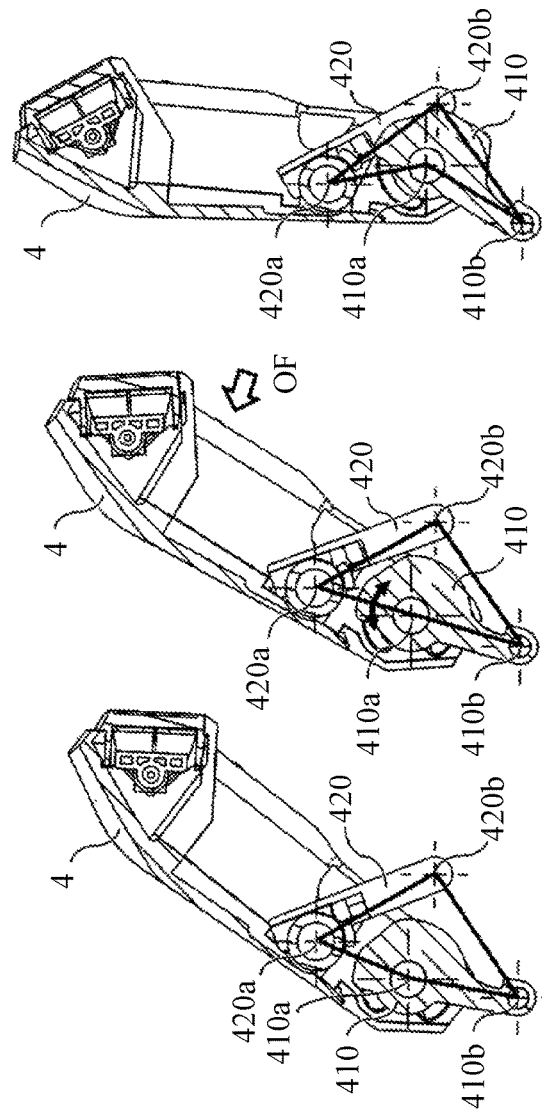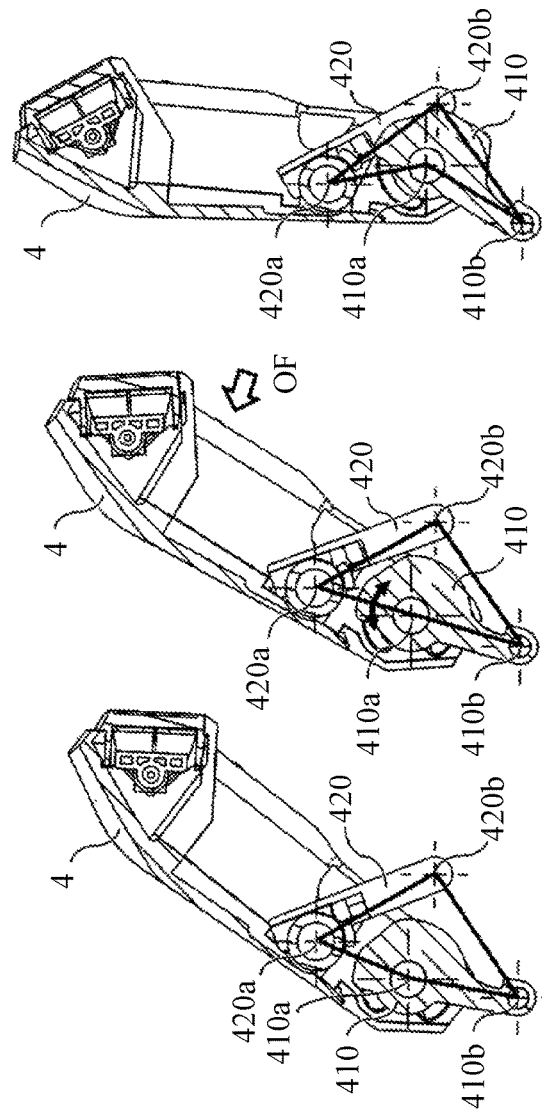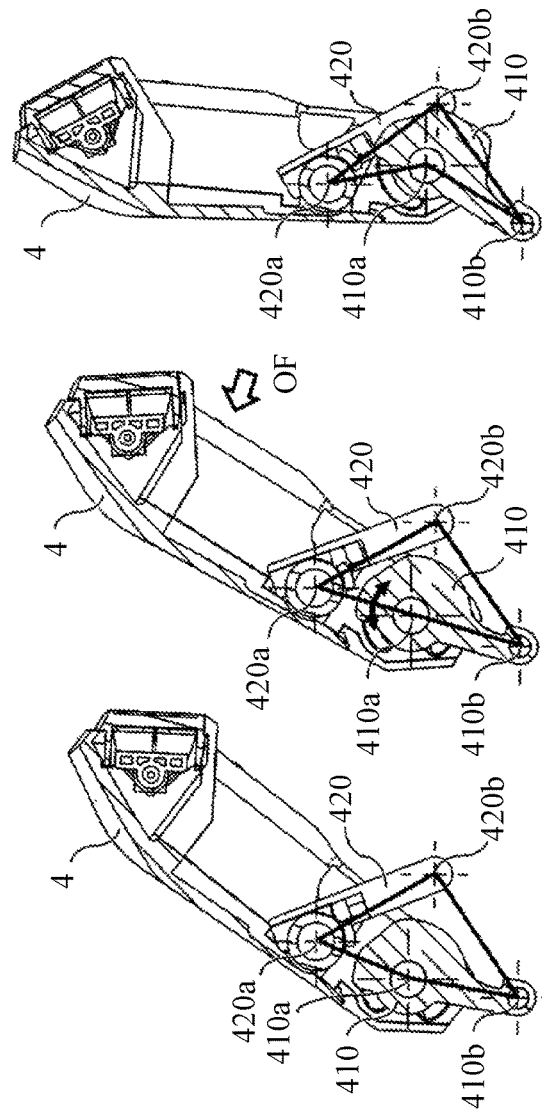

IMAGE-CAPTURING APPARATUS

BACKGROUND OF THE INVENTION

Field of the Invention

The present invention relates to image-capturing apparatuses each provided with a light-emitting unit.

Description of the Related Art

When image capturing with direct projection of a flash light to an object provides an unnatural brightness image, bounce image capturing is performed that projects the flash light to a wall or a ceiling and thereby projects a reflected indirect light to the object.

Japanese Patent Laid-Open No. 2006-078506 discloses an image capturing apparatus provided with a built-in light-emitting unit enabling such bounce image capturing.

This image-capturing apparatus enables, by changing a direction of a light emitter provided at a head of the light-emitting unit that is popped up relative to a main body of the image-capturing apparatus, flash image capturing that directly projects a flash light to an object and the bounce image capturing.

However, the image-capturing apparatus disclosed in Japanese Patent Laid-Open No. 2006-078506 provides in the head of the light-emitting unit a structure for changing the light emitter, so that the head of the light-emitting unit increases in size, which may impair design of the image-capturing apparatus. Furthermore, in a conventional image-capturing apparatus whose light-emitting unit is popped up (rotated) about an axis provided in a base portion of the light-emitting unit, if the light-emitting unit can be simply rotated to a position where the light emitter faces a ceiling or the like, the light-emitting unit significantly protrudes rearward from a rear face of the main body of the image-capturing apparatus. In this case, a face of a user trying to observe a viewfinder eye-piece window for performing bounce image capturing contacts the light-emitting unit.

BRIEF SUMMARY OF THE INVENTION

The present invention provides an image-capturing apparatus capable of performing bounce image capturing without a significant protrusion of a light-emitting unit from a rear face of the image-capturing apparatus.

The present invention provides as an aspect thereof an image-capturing apparatus including a main body, a light-emitting unit including a light emitter and being movable relative to the main body between a retracted position and a light-emitting position at which the light emitter faces a direction different from an image-capturing direction toward an object, and a moving mechanism configured to rotate the light-emitting unit about a rotation center axis not parallel to the image-capturing direction to move the light-emitting unit between the retracted position and the light-emitting position. The moving mechanism is configured such that, when the light-emitting unit is located at the retracted position, the light emitter is located on an object side further than the rotation center axis located at a first position relative to the main body, and such that, when the light-emitting unit is located at the light-emitting position, the rotation center axis is located at a second position located on the object side further than the first position. The moving mechanism includes a stopper portion provided to stop the rotation center axis at the second position.

The present invention provides as another aspect thereof an image-capturing apparatus including a main body, a light-emitting unit including a light emitter and being movable relative to the main body between a retracted position, a first light-emitting position at which the light emitter faces an image-capturing direction toward an object and a second light-emitting position at which the light emitter faces a direction different from the image-capturing direction, and a moving mechanism configured to rotate the light-emitting unit about a rotation center axis not parallel to the image-capturing direction to move the light-emitting unit from the retracted position to the first light-emitting position and further to the second light-emitting position. The moving mechanism is configured such that, when the light-emitting unit is located at the retracted position, the light emitter is located on an object side further than the rotation center axis located at a first position relative to the main body, and such that, when the light-emitting unit is located at the second light-emitting position, the rotation center axis is located at a second position located on the object side further than the first position.

Other aspects of the present invention will be apparent from the embodiments described below with reference to the drawings.

BRIEF DESCRIPTION OF THE DRAWINGS

FIGS. 9A, 9B and 9C are respectively a front view, a B-B sectional view and a C-C sectional view of the flash unit located at the front light-emitting position in Embodiment 1.

FIGS. 10A, 10B and 10C are respectively a front view, a D-D sectional view and an E-E sectional view of the flash unit located at the bounce light-emitting position in Embodiment 1.

FIGS. 11A to 11D are enlarged views of a first link member and the second link member in Embodiment 1.

FIG. 12A and FIGS. 12B, 12C and 12D are respectively a top view of the flash unit located at the retracted position and I-I sectional views of the flash unit located at the retracted position, the front light-emitting position and the bounce light-emitting position in Embodiment 1.

FIGS. 23A to 23E are H-H sectional views of the flash unit rotating from a retracted position to a bounce light-emitting position, and FIGS. 23F to 23J are G-G sectional views of the flash unit rotating from the retracted position to the bounce light-emitting position in Embodiment 4 of the present invention.

FIG. 26A and FIGS. 26B, 26C and 26D are respectively a top view of a flash unit located at a retracted position and M-M sectional views of the flash unit located at a front light-emitting position, an intermediate position (change point) and a bounce light-emitting position in Embodiment 6 of the present invention.

DETAILED DESCRIPTION OF THE EMBODIMENTS

Exemplary embodiments of the present invention will be described below with reference to the accompanied drawings.

Embodiment 1

Figure 1A:
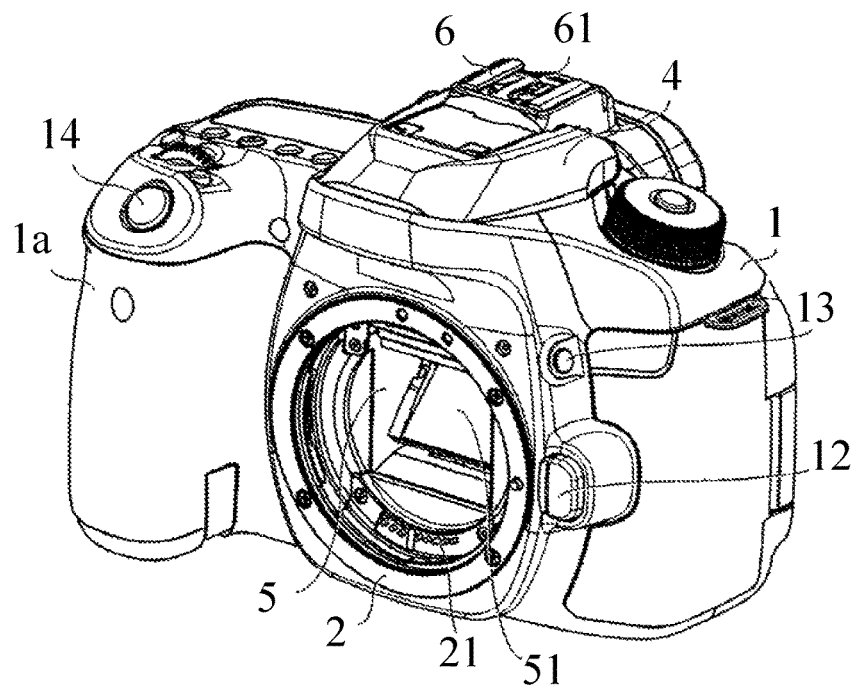
FIGS. 1A and 1B are front and rear perspective external views of a digital single-lens reflex camera that is Embodiment 1 of the present invention.
Figure 1B:
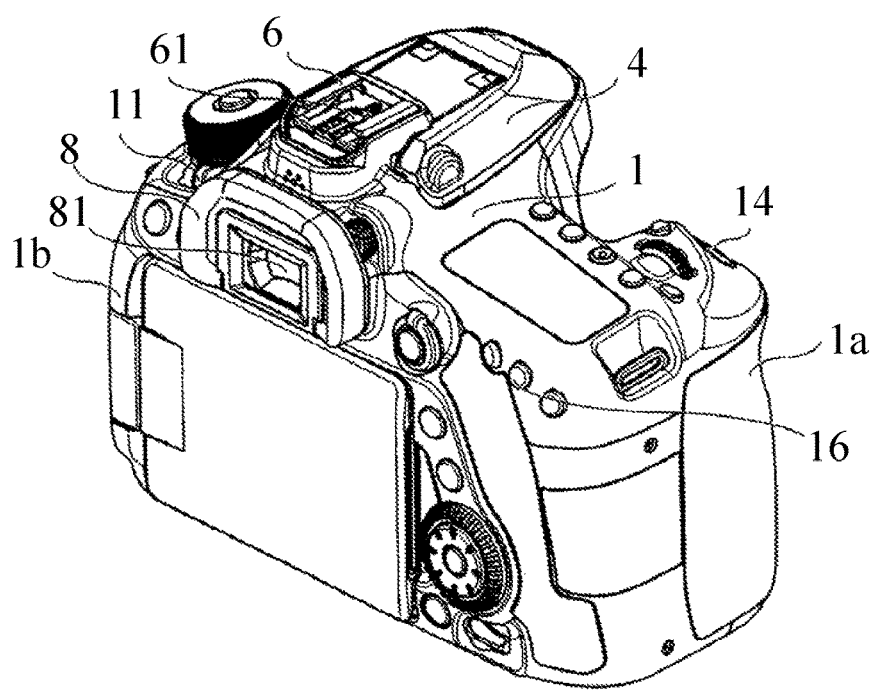
Figure 3A:
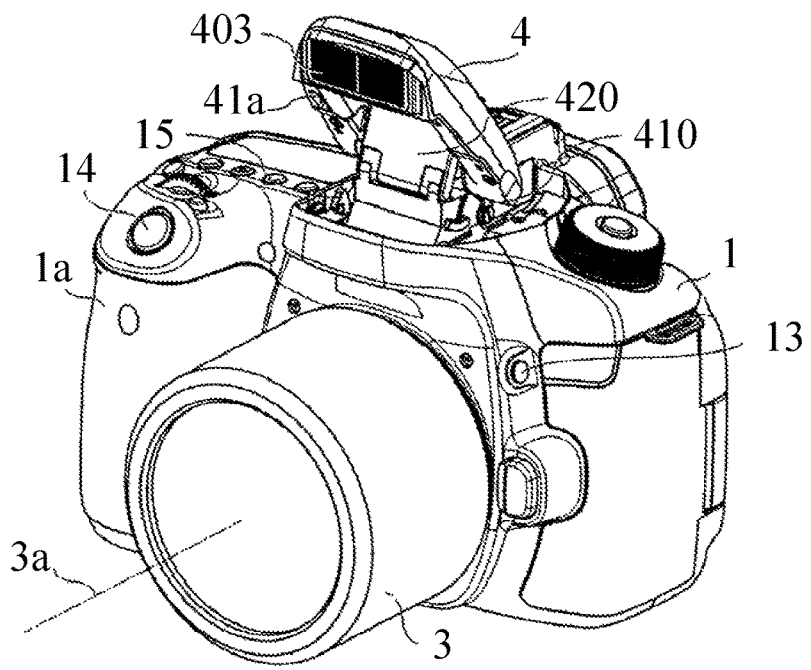
FIGS. 3A and 3B are perspective external views of the camera whose flash unit is located at a front light-emitting position and a bounce light-emitting position in Embodiment 1.
Figure 3B:
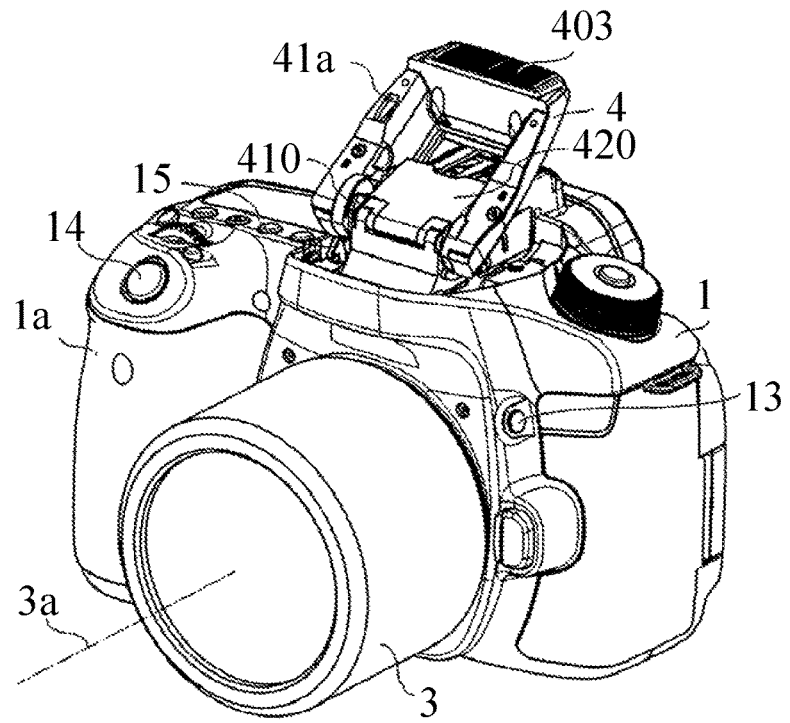

With reference to FIGS. 1A and 1B, description will be made of a configuration of a single-lens reflex digital camera as an image-capturing apparatus that is a first embodiment (Embodiment 1) of the present invention. FIG. 1A illustrates a camera body 1 as a main body of the image-capturing apparatus, which is viewed from an obliquely front direction. An image-capturing lens unit 3 illustrated in FIGS. 3A and 3B is detachably attached to the camera body 1. FIG. 1B illustrates the camera body 1 viewed from an obliquely rear direction.

In FIGS. 1A and 1B, the camera body 1 has a grip portion 1a where a user as a photographer grasps to hold the camera body 1. At an upper part of the grip portion 1a, a shutter button 14 as a switch by which the user instructs start of image capturing to the camera body 1 is provided.

The image-capturing lens unit 3 is detachably attached to a lens mount 2 provided to the camera body 1. Mount contacts 21 provided in the lens mount 2 electrically connect the camera body 1 and the image-capturing lens unit 3. The mount contacts 21 enables power supply from the camera body 1 to the image-capturing lens unit 3 and enables communication of control signals and data between the camera body 1 and the image-capturing lens unit 3.

When detaching the image-capturing lens unit 3 from the camera body 1, the user presses a lens lock releasing button 12 to release the attachment of the image-capturing lens unit 3 to the camera body 1.

A light entering an image-capturing optical system of the image-capturing lens unit 3 from an image-captured area (including an object) and passing therethrough enters a mirror box 5. The mirror box 5 includes thereinside a mirror unit 51.

In an upper part upper than the lens mount 2 in the camera body 1, a flash unit 4 as a built-in light-emitting unit is provided that is rotatable (movable) relative to the camera body 1 between a retracted position illustrated in FIGS. 1A and 1B and light-emitting positions described later.

Description of a configuration and motion of the flash unit 4 will be made later.

Furthermore, in the upper part of the camera body 1, an accessory shoe 6 is provided.

The accessory shoe 6 allows attachment thereto of accessories such as an external flash unit and a microphone. The accessory shoe 6 is provided with accessory contacts 61 for enabling electrical connection to the attached accessory.

On a rear face portion 1b of the camera body 1, a power switch 11 is provided for activating and shutting down the camera body 1 (and the image-capturing lens unit 3).

Furthermore, in a part lower than the accessory shoe 6 in the rear face portion 1b, a viewfinder 8 is provided that enables observation of the object in the image-captured area through a viewfinder eye-piece window 81.

Figure 2:
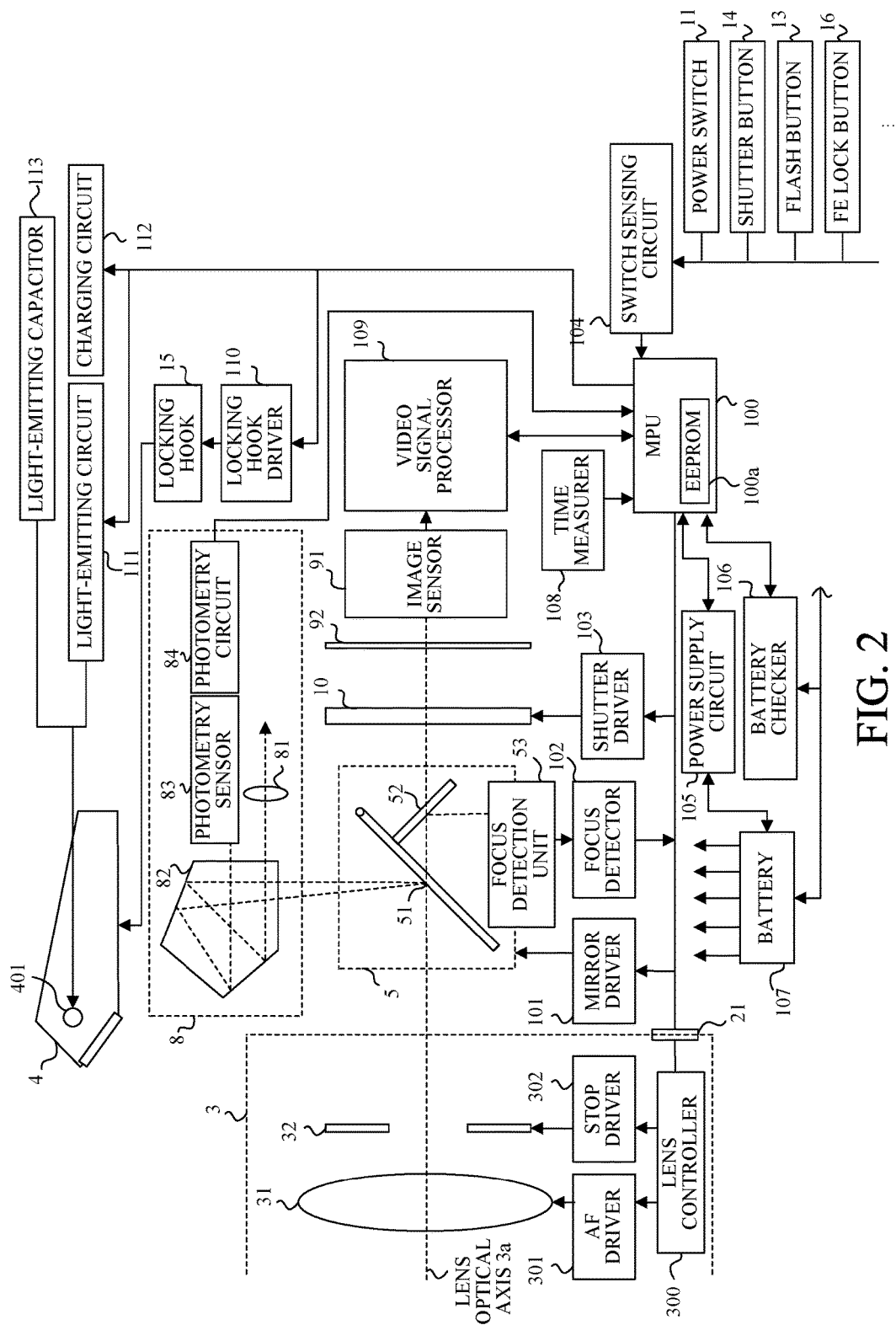
FIG. 2 is a block diagram illustrating an electrical configuration of the camera in Embodiment 1.

Next, with reference to FIG. 2, description will be made of an electrical configuration of the camera in this embodiment. In FIG. 2, the constituent elements illustrated in FIGS. 1A and 1B are denoted by the same reference numeral as those in FIGS. 1A and 1B.

The camera body 1 includes thereinside an MPU as a computer. The MPU 100 performs various processes and controls relating to operations of the camera body 1.

The MPU 100 includes an EEPROM 100a capable of storing time information measured by a time measurer 108 and information on various setting parameters.

Furthermore, the MPU 100 is connected to a mirror driver 101, a focus detector 102, a shutter driver 103, a switch sensing circuit 104, a power supply circuit 105, a battery checker 106 and the time measurer 108.

In addition, the MPU 100 is connected to a video signal processor 109 and a locking hook driver 110.

Moreover, the MPU 100 performs, via the mount contacts 21, communication with a lens controller 300 provided in the image-capturing lens unit 3. Thereby, the MPU 100 can control, through an AF driver 301 and a stop driver 302, drive of a focus lens 31 and drive of an electric aperture stop 32. Although FIG. 2 schematically illustrates the focus lens 31 as a single lens, actual focus lens is constituted by multiple lenses. The image-capturing optical system is also constituted by multiple lenses including the focus lens 31.

The AF driver 301 drives an actuator (not illustrated) such as a stepping motor to move the focus lens 31 in a direction in which a lens optical axis 3a extends (the direction corresponds to an image-capturing direction, and is hereinafter referred to as "a lens optical axis direction") for forming an in-focus object image on an image sensor 91.

The stop driver 302 drives the electric aperture stop 32 to change its aperture diameter (that is, its F-number) for controlling an amount of light.

Inside the mirror box 5, a main mirror 51 and a sub mirror 52 are provided. The main mirror 51 reflects a part of the light from the image-capturing lens unit 3 to introduce it to a penta prism 82 and transmits a remaining part thereof. The sub mirror 52 reflects the light transmitted through the main mirror 51 to introduce it to a focus detection unit 53. The focus detection unit 53 is provided for performing focus detection with a phase difference detection method. The main mirror 51 and the sub mirror 52 are disposed in an image-capturing optical path before image capturing, and are driven, when the image capturing is performed, by a motor (not illustrated) controlled by the mirror driver 101 so as to be retracted from the image-capturing optical path.

The focus detection unit 53 causes paired lights, which are parts of the light from the sub mirror 52 and pass through mutually different pupil areas of the image-capturing optical system, to form paired object images. The focus detection unit 53 photoelectrically converts the paired object images by photoelectric converters (line sensors) to produce paired phase difference image signals. The focus detector 102 performs a correlation calculation on the paired phase difference image signals to calculate a phase difference therebetween, and outputs information on the phase difference to the MPU 100.

The MPU 100 calculates, using the information on the phase difference from the focus detector 102, a defocus amount (focus state) of the image-capturing optical system, with respect to the object, and calculates therefrom a drive amount (including a drive direction) of the focus lens 31 for acquiring an in-focus state. The MPU 100 sends a focus control signal including the information on the drive amount of the focus lens 31 to the lens controller 300. The lens controller 300 moves, depending on the received focus control signal, the focus lens 31 to an in-focus position where the in-focus state for the object is obtained, through the AF driver 301.

The penta prism 82 converts an inverted image formed by the light reflected by the main mirror 51 into an erect image. The user can observe the object image as the erect image through the viewfinder 8.

Furthermore, a part of the light reflected by the main mirror 51 is introduced to a photometry sensor 83.

A photometry circuit 84 produces, from an output value of the photometry sensor 83, luminance information in the image-captured area to output it to the MPU 100.

The MPU 100 calculates an exposure value depending on the luminance information, and drives the electric aperture stop 32 according to the exposure value to set the aperture value.

A focal plane shutter 10 is driven by the shutter driver 103. The shutter driver 103 shuts the focal plane shutter 10 when the user observes the object through the viewfinder 8. On the other hand, the shutter driver 103 drives, in response to a user's press of the shutter button 14, a leading curtain (not illustrated) of the focal plane shutter 10 to open its shutter aperture, and drives, after a predetermined exposure time elapses, a trailing curtain (not illustrated) of the focal plane shutter 10 to close the shutter aperture. Thus, an exposure time of the image sensor 91 is controlled.

The image sensor 91 is a photoelectric conversion element constituted by a CMOS sensor, a CCD sensor or others, and converts the object image into electrical signals. An infrared cutting filter 92 removes an unwanted infrared light component from the light proceeding toward the image sensor 91. The video signal processor 109 performs, on the electrical signals output from the image sensor 91, video signal processes such as a filter process and a data compression process.

The switch sensing circuit 104 acquires operation status of various user-operable operation interfaces to output information on the operation statuses to the MPU 100.

The power supply circuit 105 supplies electrical powers from a power source (battery) 107 to the constituent elements in the camera body 1 and to the image-capturing lens unit 3. The power source 107 is connected to a battery checker 106 that sends information on a remaining battery level and others to the MPU 100.

The flash unit 4 rotates (pops up) relative to the camera body 1 to emit a flash light when the user desires to perform image capturing while providing an additional light to the image-captured area. The flash unit 4 includes a light source 401 as a light-emitting element such as a xenon tube or an LED. A charging circuit 112 accumulates electrical charges to a light-emitting capacitor 113 as a main capacitor. The light-emitting capacitor 113 discharges the electrical charges in response to application of a voltage to the light source 401 from a light-emitting circuit 111. In order to accurately control a flash light amount, a preliminary light emission may be performed before image capturing to control the flash light amount in a main light emission. Specifically, in response to a user's press of an FE lock button 16 when the flash unit 4 is popped up, the flash unit 4 performs the preliminary light emission. In response to the preliminary light emission, the photometry circuit 84 performs photometry through the photometry sensor 83. The flash light amount in the main light emission is set depending on a result of the photometry.

A locking hook 15 is rotatable by a motor (not illustrated). The locking hook 15 is biased by a biasing force of a spring (not illustrated) to lock the flash unit 4 at the retracted position. When the flash light is emitted, in response to a user's press of a flash button 13, the MPU 100 causes the locking hook driver 110 to drive the motor. The motor rotates the locking hook 15 against the spring biasing force to release the retracted position lock of the flash unit 4. The flash unit 4 after the retracted position lock is released is popped up by a pop-up spring (described later) to the light-emitting positions. The MPU 100 detecting a deficiency in light amount may automatically drive the motor to cause the flash unit 4 to pop up and to emit the flash light without the user's press of the flash button 13.

With reference to FIGS. 3A and 3B, description will be made of the light-emitting positions of the flash unit 4 in this embodiment. FIG. 3A illustrates a state in which the flash unit 4 is popped up from the retracted position illustrated in FIG. 1A to a position at which a light-emitting panel 403 faces forward, that is, toward a direction of the object (in other words, the lens optical axis direction). In the following description, this position is referred to as "a front light-emitting position (first light-emitting position)". FIG. 3B illustrates a state in which the flash unit 4 is rotated to a position at which the light-emitting panel 403 faces upward relative to the lens optical axis 3a (that is, toward a direction different from that of the object), in other words, at which the light-emitting panel 403 faces a direction different from that at the front light-emitting direction. In the following description, this position is referred to as "a bounce light-emitting position (second light-emitting position)". FIG. 3B illustrates one of multiple bounce light-emitting positions. The flash unit 4 can be rotated to and held at the multiple bounce light-emitting positions at which the light-emitting panel 403, that is, a light emitter 40 faces mutually different directions (bounce angles) in upward directions.

Next, with reference also to FIGS. 9A to 9C, description will be made of a pop-up mechanism configured to pop up the flash unit 4. FIG. 9A illustrates the flash unit 4 located at the front light-emitting position, a first link member 410 and a second link member 420, which are viewed from the front.

FIG. 9B illustrates a B-B section of FIG. 9A, and FIG. 9C illustrates a C-C section of FIG. 9A.

The flash unit 4 is connected to the camera body 1 via the first link member 410 and the second link member 420. The first link member 410 and the second link member 420 are respectively rotatably connected to the flash unit 4 by a first rotation shaft 410a and a second rotation shaft 420a. The first link member 410 and the second link member 420 are respectively rotatably connected to the camera body 1 by a first fixed shaft 410b and a second fixed shaft 420b.

This embodiment uses, as a moving mechanism for the flash unit 4, a four-linkage 7 in which the camera body 1 is a fixed link, the first link member 410 is a driver, the flash unit 4 is a first follower and the second link member 420 is a second follower. The flash unit 4 is rotated by motion of this four-link mechanism (hereinafter simply referred to as "a four-linkage"). The fixed link and the first follower may be other members provided integrally to the camera body and the flash unit 4. Such a configuration is equivalent to the configuration in which the fixed link is the camera body 1 and the first follower is the flash unit 4. The four-linkage 7 is biased by a pop-up spring 43 (described later) via the first link member 410 in a direction in which the flash unit 4 is rotated from the retracted position to the front light-limiting position.

Figure 4:
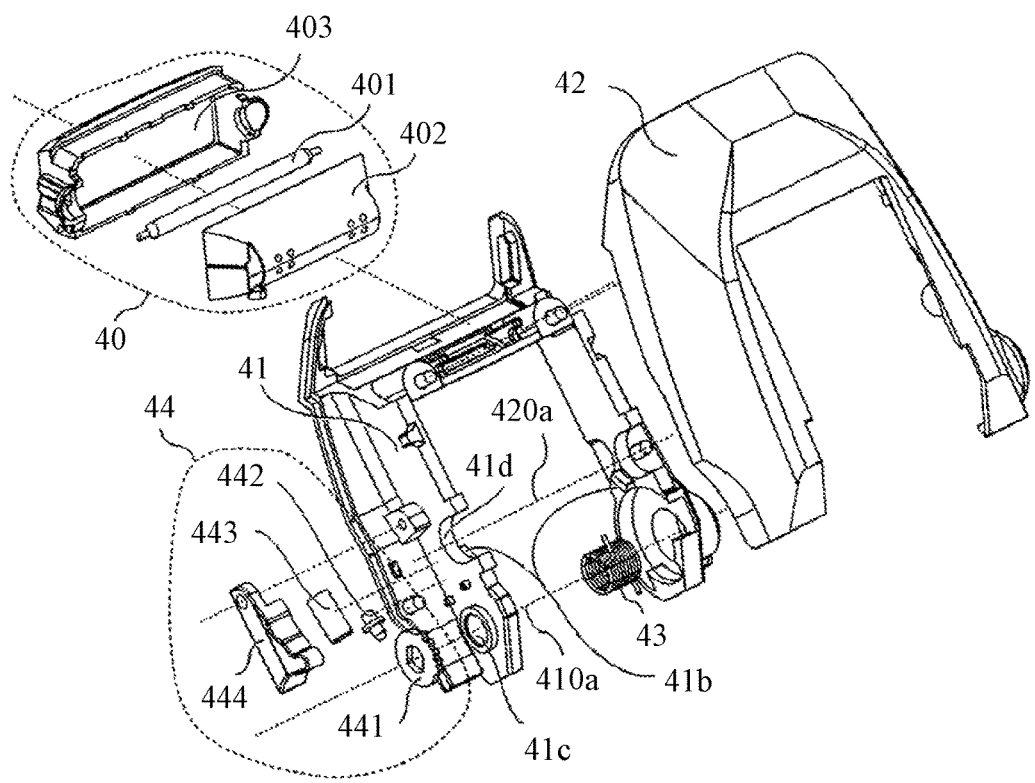
FIG. 4 is an exploded view of the flash unit in Embodiment 1.
Figure 5:
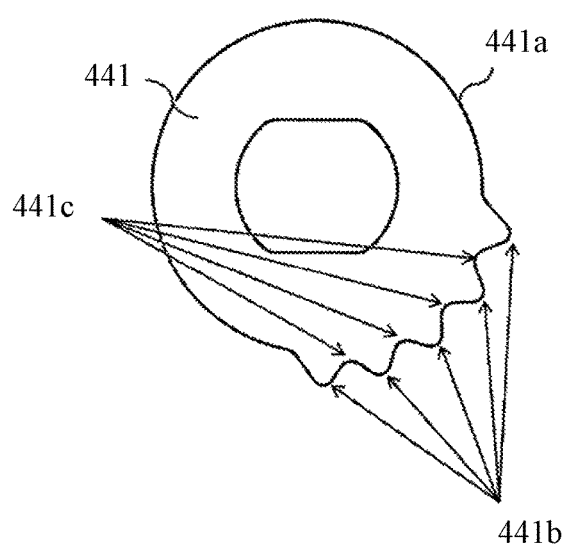
FIG. 5 illustrates a shape of a clicking plate in Embodiment 1.

With reference to FIGS. 4 and 5, description will be made of a configuration of the flash unit 4 in this embodiment. FIG. 4 is an exploded view of the flash unit 4. The flash unit 4 includes the light emitter 40, a flash case 41, a flash cover 42, the pop-up spring 43 and a clicking mechanism 44. The flash case 41 and the flash caver 42 are exterior members each having, at the retracted position, a longer length in the lens optical axis direction (front-rear direction) of the camera body 1 than that in a right-left direction orthogonal to the front-rear direction.

The flash case 41 has a hook engaging portion 41a illustrated in FIGS. 3A and 3B, a stopper receiving portion 41b, a first bearing 41c for holding the first rotation shaft 410a and a second bearing 41d for holding the second rotation shaft 420a.

The light emitter 40 includes the light source 401, a reflector 402 and the light-emitting panel 403.

The reflector 402 reflects and collects the flash light emitted from the light source 401 toward the light-emitting panel 403.

The pop-up spring 43 is disposed on (around) the first rotation shaft 410a. A fixed end of the pop-up spring 43 is engaged to the flash case 41, and a movable end thereof is engaged to the first link member 410. In the moving mechanism thus configured using the four-linkage 7 and the pop-up spring 43, the pop-up spring 43 generates a biasing force that biases the first link member 410 in a direction from the retracted position toward the front light-emitting position.

The clicking mechanism 44 includes a clicking plate 441, a clicking pin 442, a clicking biasing spring 443 and a clicking pin holder 444. The clicking plate 441 is disposed around the first rotation shaft 410a, and is fixed to the first link member 410. The clicking pin 442 and the clicking biasing spring 443 are held by the clicking pin holder 444, and are fixed to the flash case 41. The clicking pin 442 is movable relative to the flash case 41, and is biased by the clicking biasing spring 443 toward a direction of a center of the clicking plate 441.

FIG. 5 illustrates a shape of the clicking plate 441. The clicking plate 441 has, in its circumferential direction, an idle running portion 441a, multiple convex portions 441b and multiple concave portions 441c. The idle running portion 441a does not have a convex and concave shape in a radial direction of the clicking plate 441, and has a radius at which the clicking pin 442 biased toward the idle running portion 441a does not contact the idle running portion 441a. On the other hand, each of the multiple convex portions 441b generates, by the clicking pin 442 contacting and overriding it while compressing the clicking biasing spring 443, a click feeling in the rotation of the flash unit 4. The multiple concave portions 441c formed between the multiple convex portions 441b can stop the flash unit 4, by the clicking pin 442 dropping (fitting) thereinto, at the multiple bounce light-emitting positions where the bounce angles are mutually different.

The configuration of the clicking mechanism 44 in this embodiment is an example of a configuration that improves operability in changing the bounce angle, and does not limit the stop positions of the flash unit 4.

Figures 6A, 6B:
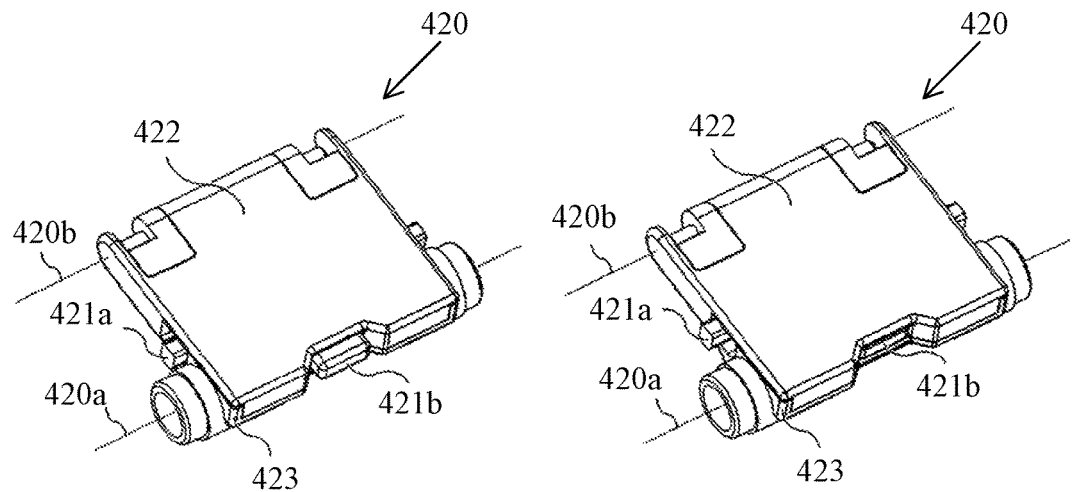
FIGS. 6A and 6B are perspective views of a second link member in Embodiment 1.
Figure 7:
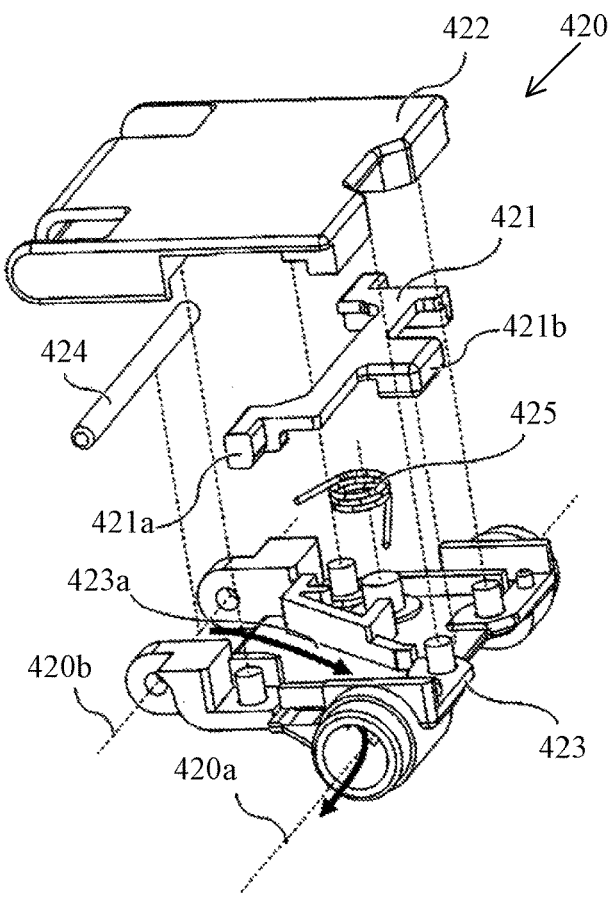
FIG. 7 is an exploded view of the second link member in Embodiment 1.

Next, with reference to FIGS. 6A, 6B and 7, detailed description will be made of a configuration of the second link member 420. FIGS. 6A and 6B are external views of the second link member 420. The second link member 420 has, in addition to a function as a link element of the four-linkage 7, a function of stopping the popped-up flash unit 4 at the front light-emitting position, and includes a bounce button 421 therefor. FIG. 6A illustrates a state before the bounce button 421 is pressed, and FIG. 6B illustrates a state after the bounce button 421 is pressed. FIG. 7 is an exploded view of the second link member 420.

The second link member 420 has the second rotation shaft 420a and the second fixed shaft 420b. The second link member 420 further includes the bounce button 421, a link cover 422, a link case 423, a shaft 424 and a bounce button biasing spring 425. The bounce button 421 has a stopper portion 421a and a push portion 421b, and is biased by the bounce button biasing spring 425 in a direction in which the push portion 421b is exposed outside the link cover 422 as illustrated in FIG. 6A. A user's push of the push portion 421b enables the stopper portion 421a to slide from the state illustrated in FIG. 6A to the state illustrated in FIG. 6B.

The link case 423 has a link hollow portion 423a through which a cable for electrically connecting the light emitter 40 of the flash unit 4 and the camera body 1 is passed in an arrow direction illustrated in FIG. 7.

This embodiment employs a releasing mechanism configured to release the stop of the flash unit 4 at the front light-emitting position in response to the user's push of the bounce button 421 provided in the second link member 420. However, this configuration is merely an example. That is, other configurations such as providing a stopper mechanism inside the camera body 1 or inside the flash unit 4 can be employed.

Figure 8A:
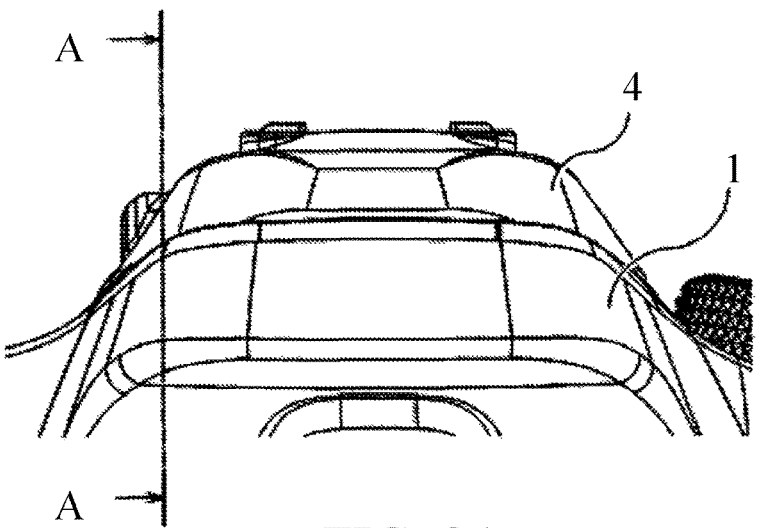
FIGS. 8A, 8B and 8C are respectively a front view and A-A sectional views of the flash unit located at a retracted position in Embodiment 1.
Figure 8B:
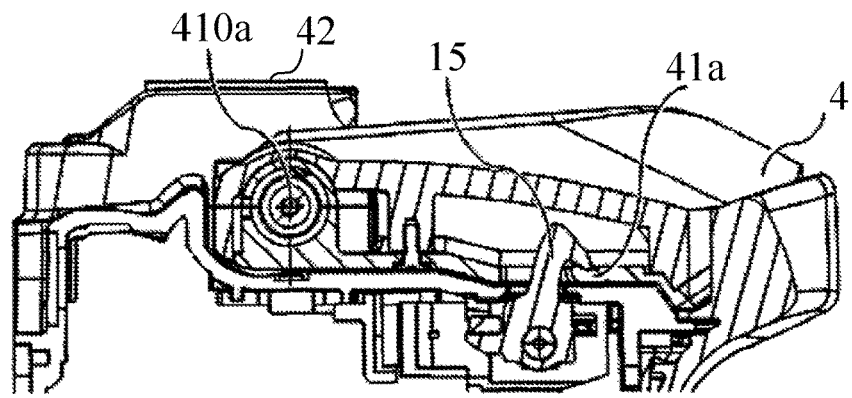
Figure 8C:
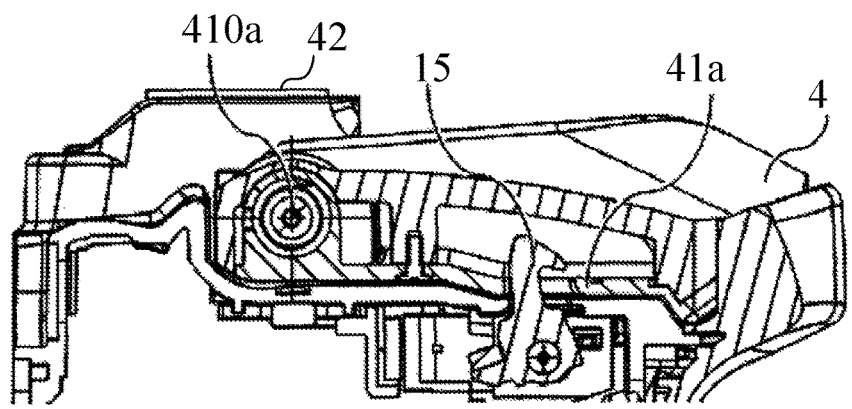

Next, with reference to FIGS. 8A to 8C, description will be made of the retracted position lock of the flash unit 4. FIG. 8A illustrates the flash unit located at the retracted position, which is viewed from the front. FIG. 8B illustrates an A-A section of the flash unit 4 illustrated in FIG. 8A. FIG. 8C illustrates the A-A section of the flash unit 4 when its retracted position lock by the locking hook 15 is released.

When image capturing with the flash light (hereinafter referred to as "flash image capturing") is not performed, the user can retract the flash unit 4 relative to the camera body 1 as illustrated in FIG. 1A. At the retracted position, as illustrated in FIG. 8B, the locking hook 15 of the camera body 1 engages with the hook engaging portion 41a of the flash unit 4, and thereby the flash unit 4 biased by the pop-up spring 43 illustrated in FIG. 4 is locked (held) at the retracted position.

Figure 14:
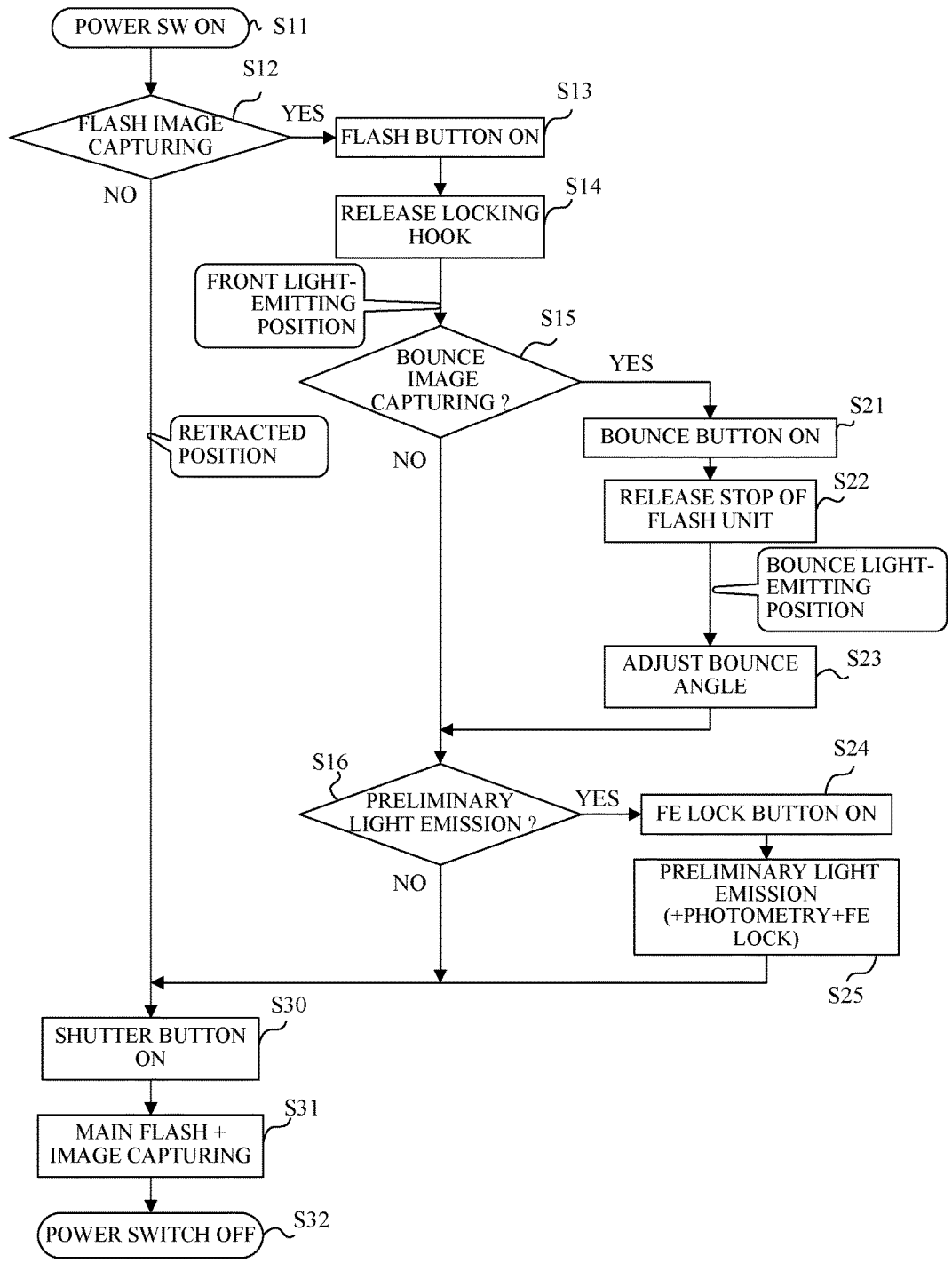
FIG. 14 is a flowchart of an operation procedure of flash image capturing in Embodiment 1.

FIG. 14 illustrates a user's operation and motion of the flash unit 4 and the camera body 1 when the flash image capturing is performed. In the following description, "S" means a step. FIGS. 11A and 11B are enlarged views of the four-linkage 7 including the first and second link members 410 and 420 illustrated in FIG. 9B. FIG. 11A illustrates a state where the flash unit 4 is in halfway of the pop-up from the retracted position to the front light-emitting position. FIG. 11B illustrates a state where the flash unit 4 is located at the front light-emitting position. FIG. 11C illustrates a state where the bounce button 421 is pushed. FIG. 11D illustrates a state where the flash unit 4 is located at the bounce light-emitting position.

The user turning on the power switch 11 of the camera body 1 at S11 and then determining to perform the flash image capturing at S12 presses at S13 the flash button 13 illustrated in FIG. 1A. In response to receiving from the switch sensing circuit 104 a signal indicating that the flash button 13 has been pressed, the MPU 100 drives the motor (not illustrated) at S14 to rotate the locking hook 15 in a lock-releasing direction as also illustrated in FIG. 8C. Thereby, the flash unit 4 after the retracted position lock is released is popped up by the biasing force of the pop-up spring 43 to the front light-emitting position. During the pop-up, as illustrated by an arrow in FIG. 11A, the stopper portion 421a of the bounce button 421 and the stopper receiving portion 41b of the flash case 41 are rotated about the second rotation shaft 420a in a direction in which they approach each other.

Thereafter, as illustrated in FIG. 11B, the stopper portion 421a contacts the stopper receiving portion 41b (their contact portion is indicated by a bold line in the figure), and thereby the flash unit 4 stops its pop-up at the front light-emitting position illustrated in FIG. 3A.

As described above, this embodiment employs the above-described stopping mechanism in which the flash unit 4 contacts the stopper portion 421a to be stopped at the front light-emitting position, and the releasing mechanism in which the user's operation of the bounce button 421 allows the rotation of the flash unit 4 to the bounce light-emitting position. This configuration enables stopping the flash unit 4 at the front light-emitting position with high positional accuracy.

Furthermore, as illustrated in FIG. 8B, at the retracted position the push portion 421b of the bounce button 421 is covered by the flash cover 42 and thereby is not exposed, so that the user cannot push the push portion 421b.

On the other hand, as illustrated in FIG. 9A, at the front light-emitting position the push portion 421b of the bounce button 421 is exposed, so that the user can push the push portion 421b. The bounce button 421 has its role after the flash unit 4 is popped up, that is, the bounce button 421 is not used at the retracted position. Therefore, employing the configuration that the pop-up of the flash unit 4 exposes the bounce button 421 so as to enable the user's operation thereof makes it possible to prevent confusion of the user.

Moreover, in the clicking mechanism 44, as illustrated in FIGS. 5 and 9C, in order to prevent the clicking plate 441 and the clicking pin 442 from contacting each other, the idle running portion 441a is provided on the clicking plate 441. In halfway of the pop-up from the retracted position to the front light-emitting position, the click feeling is not necessary. Thus, providing the idle running portion 441a enables preventing, against the pop-up drive by the pop-up spring 43, generation of a resistance due to the contact between the clicking pin 442 and the convex portions 441b. This configuration enables setting a spring force of the pop-up spring 43 to a value appropriate for the pop-up drive of the flash unit 4, without considering an influence of the clicking mechanism 44.

Next, description will be made of a user's operation and motion of the flash unit 4 when the bounce image capturing is performed. FIG. 10A illustrates the flash unit 4, the first link member 410 and the second link member 420, which are viewed from the front. FIG. 10B and FIG. 10C respectively illustrate D-D and E-E sections thereof in FIG. 10A.

After the flash unit 4 is popped up to the front light-emitting position, the user determining to perform the bounce image capturing at S15 pushes at S21 the push portion 421b of the bounce button 421. In response thereto, at S22, as illustrated in FIG. 11C, the stopper portion 421a slides to an arrow direction in the figure, and thereby the contact of the stopper portion 421a and the stopper receiving portion 41b (that is, the stop of the flash unit 4 at the front light-emitting position) is released. Therefore, as illustrated in FIGS. 11D and 10B, the flash unit 4 becomes rotatable to the bounce light-emitting position.

Thus, the flash unit 4 is rotated by the biasing force of the pop-up spring 43 toward the bounce light-emitting position (that is, toward the multiple bounce light-emitting positions).

The clicking pin 442 contacting a side face of the convex portion 441b closest to the idle running portion 441a among the multiple convex portions 441b stops the rotation of the flash unit 4. This position is a first bounce light-emitting position among the multiple bounce light-emitting position.

Next, description will be made of a user's operation for changing the bounce angle at S23 and motion of the flash unit 4 therefor. When changing the bounce angle from a state where any one of the multiple bounce light-emitting positions, the user manually rotates the flash unit 4 as illustrated by an arrow in FIG. 10C. With the rotation of the flash unit 4, the clicking pin 442 overrides the convex portion 441b adjacent to the concave portion 441c into which the clicking pin 442 has dropped while compressing the clicking biasing spring 443, and then drops into the next concave portion 441c. The clicking pin 442 overriding each of the convex portions 441b generates the click feeling. As described above, when intending to change the bounce angle, the user manually rotates the flash unit 4 to any one of the bounce light-emitting positions while receiving the click feeling, and thereby the flash unit 4 is stopped 4 at the one bounce light-emitting position.

In the state where the flash unit 4 is stopped at the front light-emitting position or the one bounce light-emitting position, the user determining to cause the flash unit 4 to perform the preliminary light emission at S16 presses at S24 the FE lock button 16 illustrated in FIG. 1B. In response to the press of the FE lock button 16, at S25 the MPU 100 causes the flash unit 4 to perform the preliminary light emission, and causes the photometry sensor 83 and the photometry circuit 84 to perform photometry. Then, the MPU 100 calculates the flash light amount in the main light emission depending on a photometry result of the preliminary light emission.

The user determining not to perform the flash image capturing at S12, determining not to perform the preliminary light emission at S16, or determining to perform the preliminary light emission at S16 and then waiting for the preliminary light emission at S25 presses the shutter button 14 at S30. In response to receiving a signal from the switch sensing circuit 104, which indicates that the shutter button 14 has been pressed, the MPU 100 performs image capturing at S31. In the image capturing, the MPU 100 causes the flash unit 4 to perform the main light emission simultaneously with the image capturing, except when the user has determined not to perform the flash image capturing at S12.

With reference to FIGS. 12A to 12D and FIGS. 13A to 13C, description will be made of positional relations between the flash unit 4 and the first rotation shaft 410a at the retracted position, the front light-emitting position and the bounce light-emitting position. In FIGS. 12A to 12D and FIGS. 13A to 13C, F represents a front side where the camera body has a front face on which the lens mount 2 is provided and which faces toward the object, and R represents a rear side (opposite-to-object side) where the camera body 1 has the rear face portion 1b opposite to the front face.

FIG. 12A illustrates the flash unit 4 located at the retracted position, which is viewed from its top. FIG. 12B illustrates an I-I section of the flash unit 4 illustrated in FIG. 12A. FIGS. 12C and 12D respectively illustrate the I-I sections of the flash unit 4 located at the front and bounce light-emitting positions. In these figures, P1, P2 and P3 represent changes of a position of the first rotation shaft (rotation center axis) 410a in the lens optical axis direction (front-rear direction).

Figure 13A:
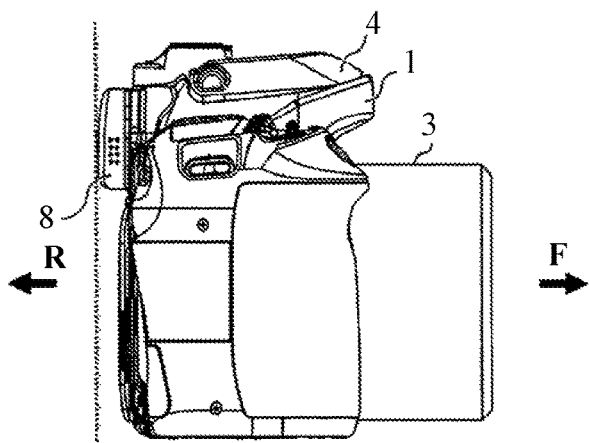
FIGS. 13A, 13B and 13C are side views of the flash unit located at the retracted position, the front light-emitting position and the bounce light-emitting position in Embodiment 1.
Figure 13B:
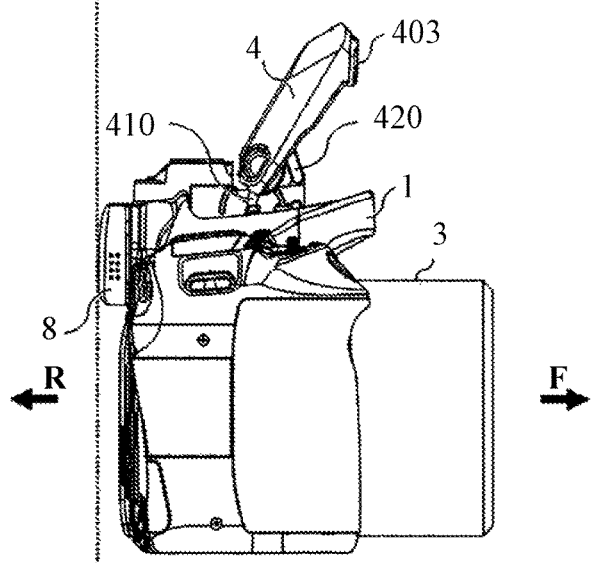
Figure 13C:
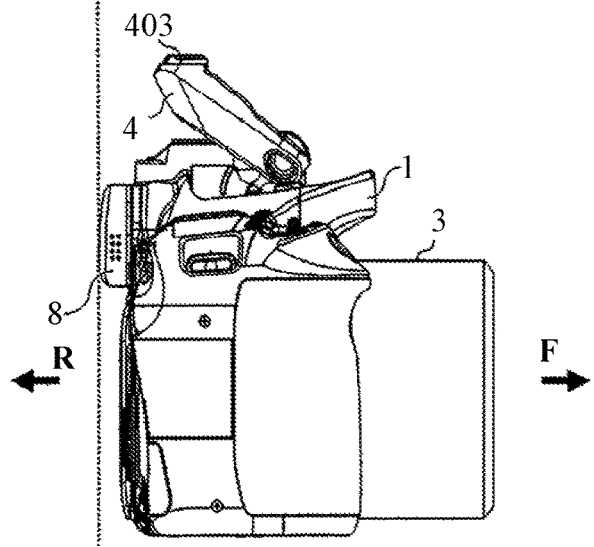

In addition, S1 represents a position of the first fixed shaft 410b that is a rotation center of the first link member 410. FIG. 13A illustrates the camera body 1 viewed from its side when the flash unit 4 is located at the retracted position as illustrated in FIGS. 12A and 12B. FIG. 13B illustrates the camera body 1 viewed from its side when the flash unit 4 is located at the front light-emitting position as illustrated in FIG. 12C. FIG. 13C illustrates the camera body 1 viewed from its side when the flash unit 4 is located at the bounce light-emitting position as illustrated in FIG. 12D.

As illustrated in FIGS. 12A, 12B and 13A, when the flash unit 4 is located at the retracted position, the light-emitting panel 403 faces obliquely downward on the front side and is located on the front side F further than the first rotation shaft 410a. This position of the first rotation shaft 410a is P1 as a first position.

As illustrated in FIGS. 12C and 13B, when the flash unit 4 is popped up to the first light-emitting position, the light-emitting panel 403 faces the lens optical axis direction. During this pop-up, the first link member 410 is rotated about the first fixed shaft 410b, and thereby the first rotation shaft 410a is moved relative to the camera body 1 to the front side F from P1 to P2 (third position).

As a result, the light-emitting panel 403 is moved on the front side F further than when the flash unit 4 is popped up with no movement of the first rotation shaft 410a relative to the camera body 1. This makes the light projected to the object by the image-capturing lens unit 3 less blocked.

As illustrated in FIGS. 12D and 13C, the rotation of the flash unit 4 to the bounce light-emitting position further rotates the first link member 410 from the front light-emitting position. With this rotation, the first rotation shaft 410a is moved from P2 to P3 (second position) on the front side F further than P2, and thereby at the bounce light-emitting position the first rotation shaft 410a is located on the front side F further than the light-emitting panel 403. As described above, in this embodiment, a head portion, which includes the light-emitting panel 403, of the flash unit 4 is rotated to the rear side R, and the first rotation shaft 410a is moved to the front side F. This enables reducing a movement amount of the head portion of the flash unit 4 to the rear side R relative to the camera body 1. Therefore, as illustrated in FIGS. 13A to 13C, in addition to at the retracted position and the front light-emitting position, at the bounce light-emitting position the flash unit 4 can be located on the front side F further than the viewfinder (eye-piece window) 8 located at a rearmost end of the rear face portion 1b. This location of the flash unit 4 at the bounce light-emitting position enables, in a state where the user moves his/her face close to the camera body 1 to observe the viewfinder 8, avoiding interference (contact) of the flash unit 4 with the user's face.

As described above, in this embodiment, at the retracted position of the flash unit 4, the light emitter 40 is located relative to the camera body 1 on the front side F further than the first rotation shaft 410a located at P1. Furthermore, at the bounce light-emitting position, the first rotation shaft 410a is located at P3 on the front side F further than P1, and the light emitter 40 is located on the rear side R further than the first rotation shaft 410a. This enables preventing the flash unit 4 (light emitter 40) from protruding from the rear face portion 1b of the camera body 1, and thereby enables preventing the flash unit 4 from interfering with the user's face.

Moreover, at the front light-emitting position, the first rotation shaft 410a is located on the front side F further than P1 and on the rear side R further than P3. This enables moving the light emitter to the front side F, which enables preventing the light from the light emitter 40 from being blocked by the image-capturing lens unit 3.

Embodiment 2

Embodiment 1 described the case where the four-link mechanism is used as the moving mechanism that pops up the flash unit 4 to the front light-emitting position and where the flash unit 4 is allowed to be rotated to the multiple bounce light-emitting positions.

On the other hands, a second embodiment (Embodiment 2) of the present invention uses, instead of the four-link mechanism, a slider link mechanism as the moving mechanism. In this embodiment, constituent elements common to those in Embodiment 1 are denoted by the same reference numeral as those in Embodiment 1, and description thereof is omitted.

Figure 15:
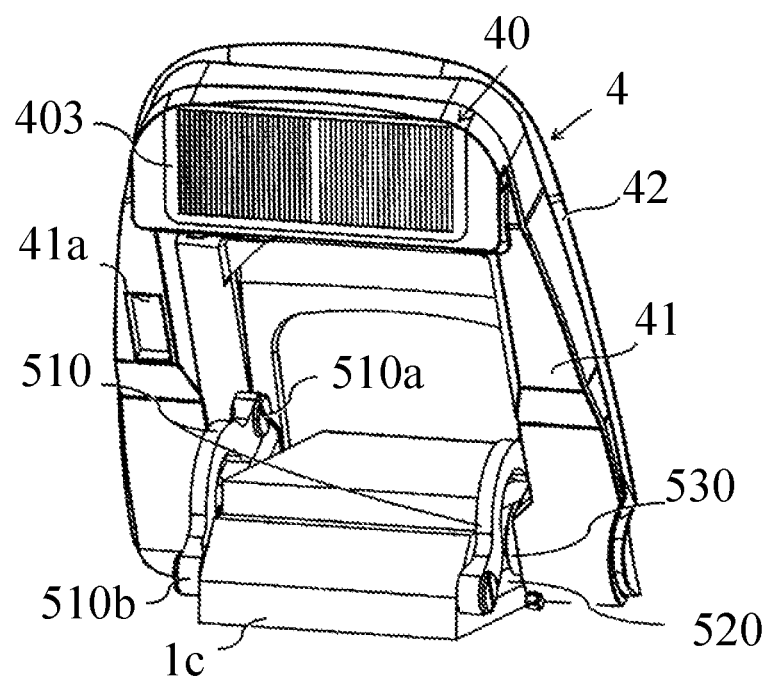
FIG. 15 is a perspective external view of a flash unit provided to a camera that is Embodiment 2 of the present invention.
Figure 16A:
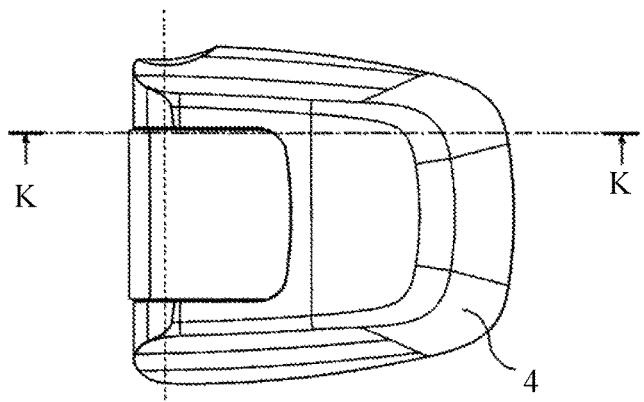
FIG. 16A and FIGS. 16B, 16C and 16D are respectively a top view of the flash unit located at a retracted position and K-K sectional views of the flash unit located at the retracted position, a front light-emitting position and a bounce light-emitting position in Embodiment 2.
Figure 16B:
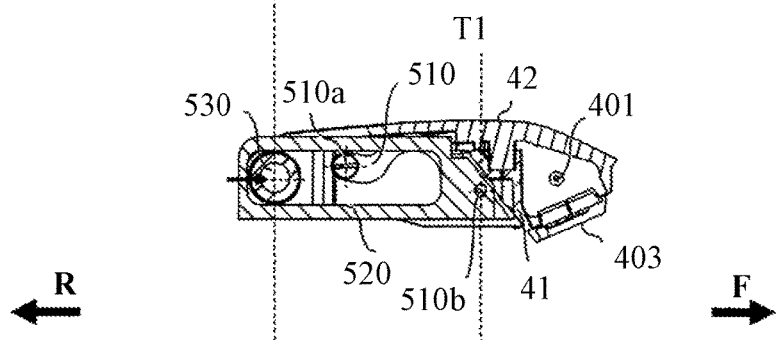
Figure 16C:
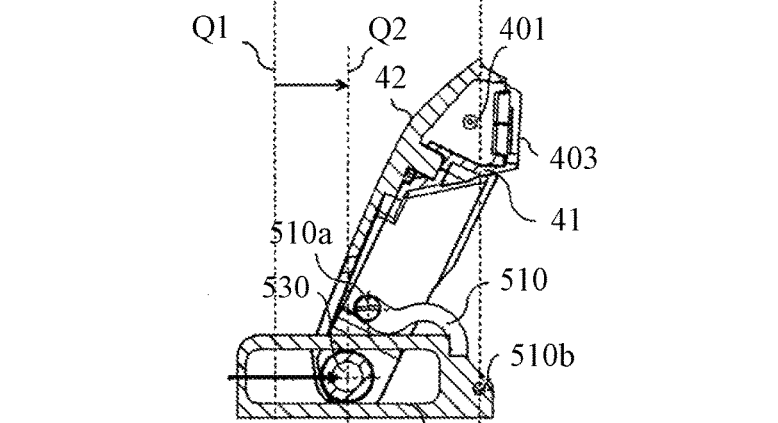
Figure 16D:
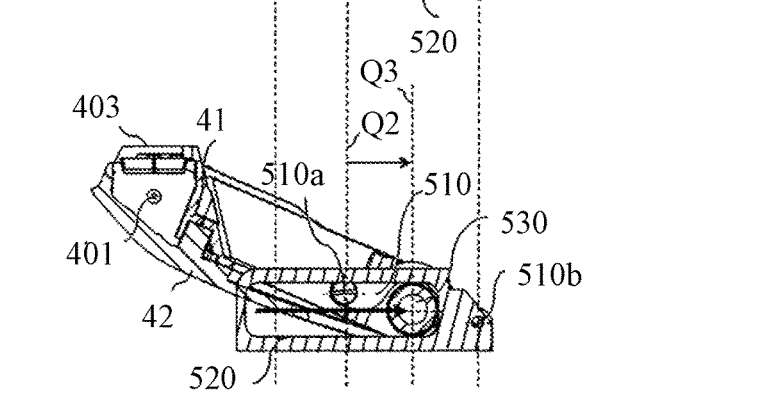

With reference to FIG. 15 and FIGS. 16B to 16D, description will be made of a configuration of the slider link mechanism in this embodiment. FIG. 15 illustrates an exterior of the flash unit 4 located at the front light-emitting position. FIGS. 16B, 16C and 16D respectively illustrate sections of the flash unit 4 at the retracted position, the front light-emitting position and the bounce light-emitting position. These sections are K-K sections of the flash unit 4 viewed from its top in FIG. 16A. These figures illustrate a top portion 1c of a camera body 1, a slider link member 510 and a slide rail 520. The flash unit 4 includes, as in Embodiment 1, the light emitter 40, the flash case 41 and the flash cover 42. The light emitter 40 includes the light source 401, the reflector (not illustrated) 402 and the light-emitting panel 403.

The flash case 41 has the hook engaging portion 41a and a slide rotation shaft 530.

The flash unit 4 is connected to the camera body 1 via the slider link member 510 and the slide rail 520. The slider link member 510 is rotatably connected to the flash unit 4 by a rotation shaft 510a, and is rotatably connected to the camera body 1 by a fixed shaft 510b.

The slide rail 520 is fixed to the camera body 1. The slide rotation shaft 530 of the flash case 41 is inserted into a rail groove portion of the slide rail 520, and is slidable in the lens optical axis direction (front-rear direction) while being guided by the slide rail 520. The slider link member 510, the slide rail 520 and the slide rotation shaft 530 constitute the slider link mechanism.

The slide rotation shaft 530 sliding along the slide rail 520 in the front-rear direction causes the flash unit 4 connected to the slider link member 510 by the rotation shaft 510a to rotate about the slide rotation shaft (rotation center axis) 530. Thereby, the flash unit 4 is popped up from the retracted position to the front light-emitting position, and is rotated to the bounce light-emitting position.

Although this embodiment describes the case where the slide rail 520 as a member separate from the camera body 1 is fixed to the camera body 1, the slide rail 520 may be formed integrally with the camera body 1.

With reference to FIGS. 16B to 16D and FIGS. 17A to 17C, description will be made of positional relations between the light emitter 40 and the slide rotation shaft 530 at the retracted position, the front light-emitting position and the bounce light-emitting position. In FIGS. 16B to 16D and FIGS. 17A to 17C, F represents the front side where the camera body 1 has the front face on which the lens mount 2 is provided and which faces toward the object, and R represents the rear side where the camera body 1 has the rear face portion 1b opposite to the front face. In these figures, Q1, Q2 and Q3 represent changes of a position of the slide rotation shaft 530 in the lens optical axis direction, and T1 represents a position of the fixed shaft 510b.

Figure 17A:
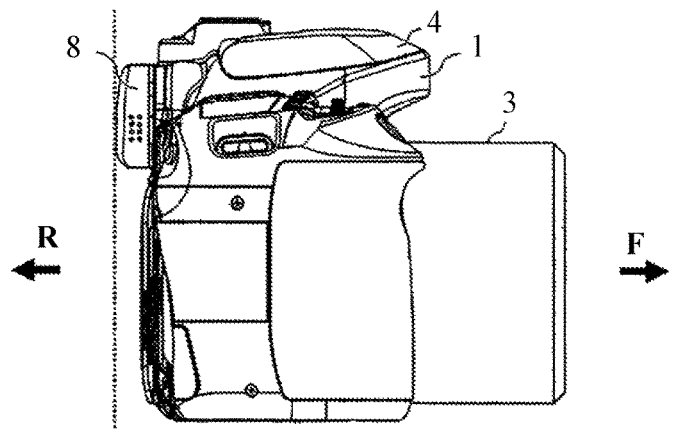
FIGS. 17A, 17B and 17C are side views of the flash unit located at the retracted position, the front light-emitting position and the bounce light-emitting position in Embodiment 2.

At the retracted position illustrated in FIGS. 16B and 17A, the light-emitting panel 403 faces forward and obliquely downward, and is located on the front side F further than the slide rotation shaft 530. This position of the slide rotation shaft 530 is Q1 as a first position.

Figure 17B:
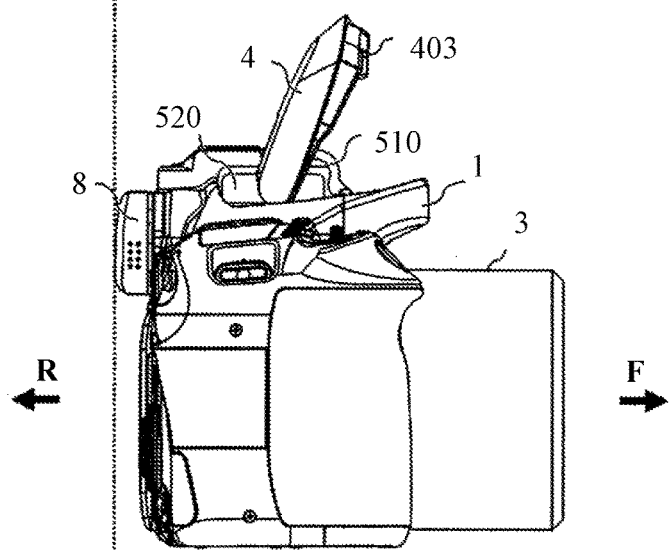

The slide rotation shaft 530 is biased by a pop-up spring (not illustrated) in an arrow direction in FIG. 16B. As described in Embodiment 1, in response to the release of the lock by the locking hook 15, the flash unit 4 is popped up from the retracted position toward the front light-emitting position. Similarly, the flash unit 4 is rotated to the bounce light-emitting position. When the flash unit 4 is popped up to the front light-emitting position as illustrated in FIGS. 16C and 17B, the light-emitting panel 403 faces the lens optical axis direction. During the flash unit 4 is popped up, the slide rotation shaft 530 is moved to the front side F along the slide rail 520 from Q1 to Q2 (third position). As in Embodiment 1, the light emitting panel 403 is moved to the front side F further than when the flash unit 4 is popped up with no movement of the slide rotation shaft 530. This makes the light projected to the object by the image-capturing lens unit 3 less blocked.

Figure 17C:
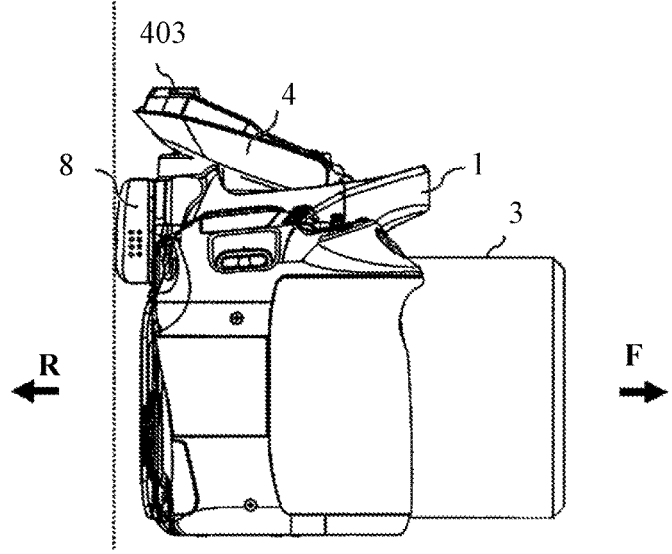

As illustrated in FIG. 16D, when the flash unit 4 is rotated toward the bounce light-emitting position, the slide rotation shaft 530 is moved to the front side F along the slide rail 520 from Q2 to Q3 (second position). With this rotation, at the bounce light-emitting position the slide rotation shaft 530 is located on the front side F further than the light-emitting panel 403. As in Embodiment 1, the head portion, which includes the light-emitting panel 403, of the flash unit 4 is rotated to the rear side R, and the slide rotation shaft 530 is moved to the front side F. This enables reducing the movement amount of the head portion of the flash unit 4 to the rear side R relative to the camera body 1. Therefore, as illustrated in FIGS. 17A to 17C, in addition to at the retracted position and the front light-emitting position, at the bounce light-emitting position the flash unit 4 can be located on the front side F further than the viewfinder (eye-piece window) 8 located at the rearmost end of the rear face portion 1b. This location of the flash unit 4 at the bounce light-emitting position enables, in the state where the user moves his/her face close to the camera body 1 to observe the viewfinder 8, avoiding interference (contact) of the flash unit 4 with the user's face.

Embodiment 3

A third Embodiment (Embodiment 3) of the present invention uses a planetary gear mechanism as the moving mechanism. In this embodiment, constituent elements common to those in Embodiment 1 are denoted by the same reference numeral as those in Embodiment 1, and description thereof is omitted.

Figure 18:
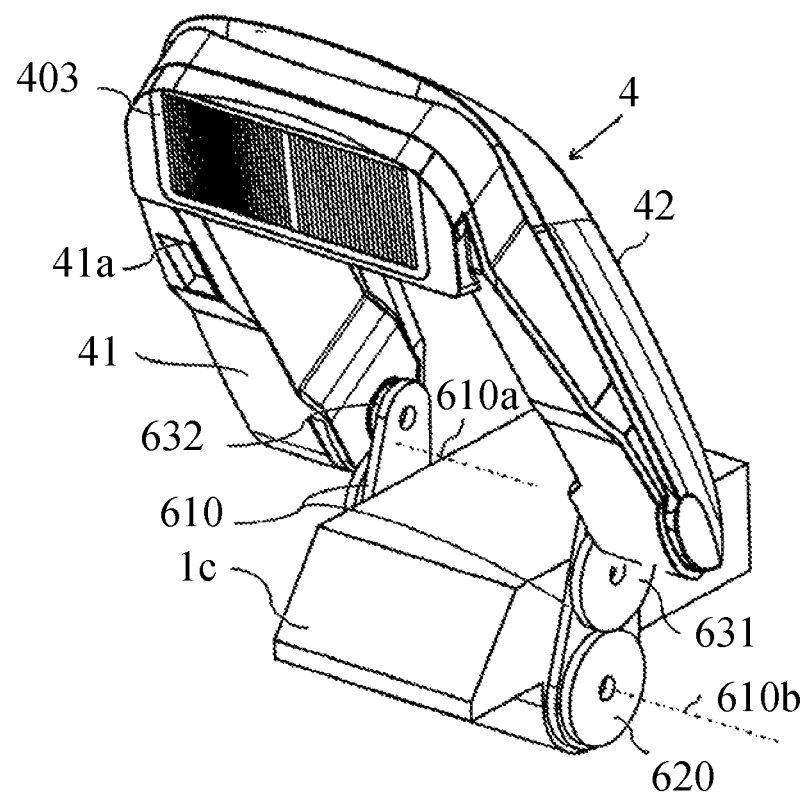
FIG. 18 is a perspective external view of a flash unit provided to a camera that is Embodiment 3 of the present invention.
Figure 19A:
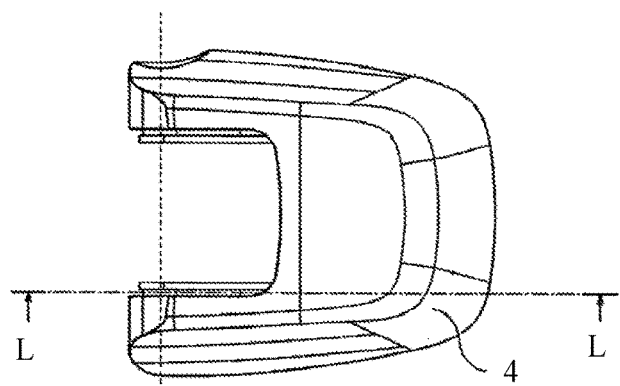
FIG. 19A and FIGS. 19B, 19C and 19D are respectively a top view of the flash unit located at a retracted position and L-L sectional views of the flash unit located at the retracted position, a front light-emitting position and a bounce light-emitting position in Embodiment 3.
Figure 19B:
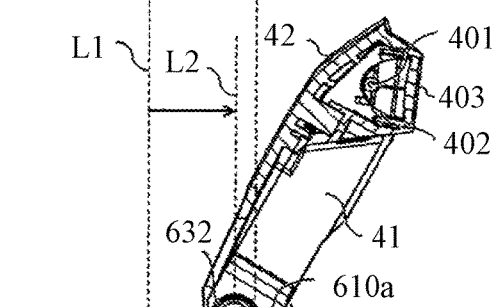
Figure 19C:
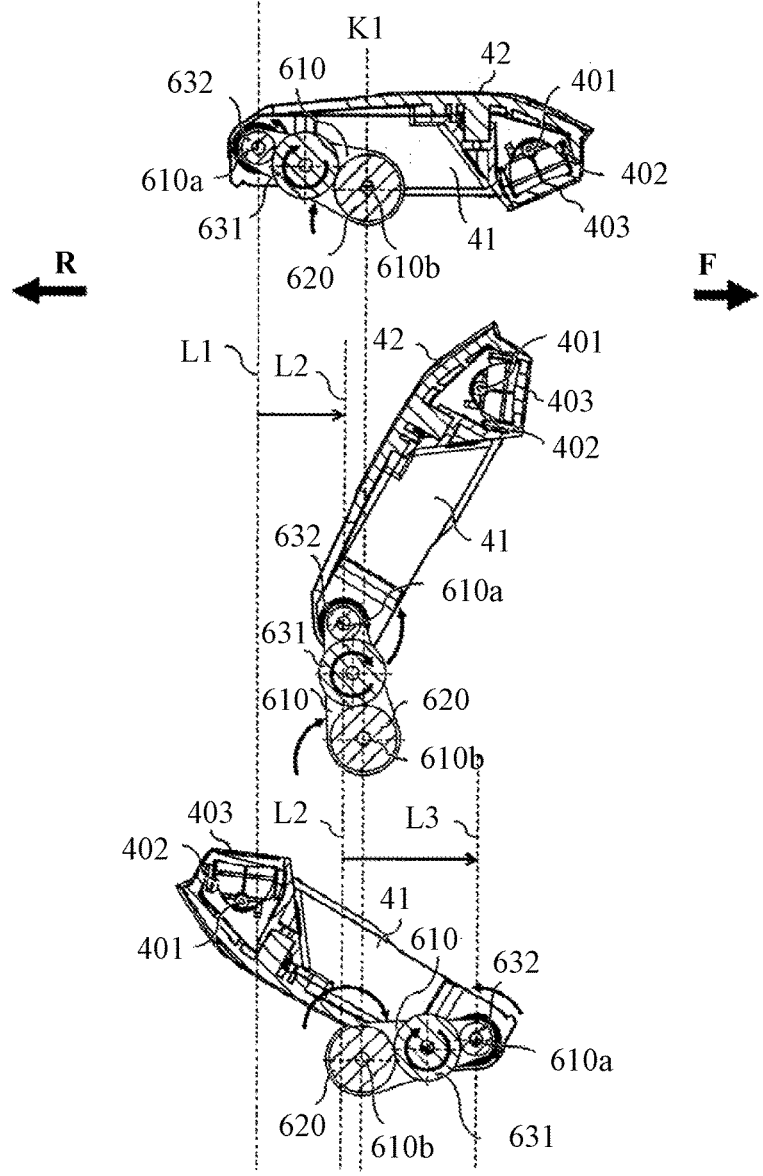
Figure 19D:
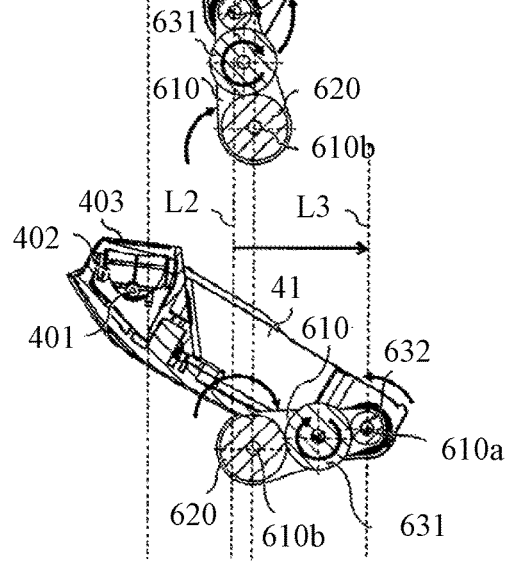

With reference to FIG. 18 and FIGS. 19B to 19D, description will be made of a configuration of the planetary gear mechanism. FIG. 18 illustrates an exterior of a flash unit 4 located at the front light-emitting position. FIGS. 19B to 19D respectively illustrate sections of the flash unit 4 at the retracted position, the front light-emitting position and the bounce light-emitting position. The sections are L-L sections of the flash unit 4 viewed from its top in FIG. 19A.

As illustrated in these figures, the planetary gear mechanism provided around a top portion 1c of the camera body 1, and includes a planetary carrier arm 610, a sun gear (first gear) 620, a first planetary gear (second gear) 631 and a second planetary gear 632. The flash unit 4 includes, as in Embodiment 1, the light emitter 40, the flash case 41 and the flash cover 42.

The light emitter 40 includes the light source 401, the reflector 402 and the light-emitting panel 403.

The flash case 41 has the hook engaging portion 41a.

The flash unit 4 is connected to the camera body 1 via the planetary carrier arm 610 that is a supporting member. The planetary carrier arm 610 is rotatably connected to the flash unit 4 by a rotation shaft (rotation center axis) 610a, and is rotatably connected to the camera body 1 by a fixed shaft 610b. The sun gear 620 is disposed on (around) the fixed shaft 610b, and is fixed to the camera body 1. The second planetary gear 632 is disposed on (around) the rotation shaft 610a, and is fixed to the flash unit 4.

Although this embodiment describes the case where the second planetary gear 632 as a member separate from the flash unit 4 is fixed to the flash unit 4, the second planetary gear 632 may be formed integrally with the flash case 41.

The first planetary gear 631 is rotatable held by the planetary carrier arm 610, and meshes with the sun gear 620 and the second planetary gear 632.

Although this embodiment includes two planetary gears, the number of planetary gears is not limited as long as even numbers since a rotation direction of the flash unit 4 is not changed.

When the planetary carrier arm 610 connecting the camera body 1 and the flash unit 4 is rotated about the fixed shaft 610b in the lens optical axis direction (front-rear direction), the first planetary gear 631 revolves about the sun gear 620 while rotating about its center. With this movement, the rotation shaft 610a connecting the planetary carrier arm 610 and the flash unit 4 is moved in the lens optical axis direction. Furthermore, the second planetary gear 632 is rotated by the rotation of the first planetary gear 631, and thereby the flash unit 4 is rotated about the rotation shaft 610a. Thus, the flash unit 4 is popped up from the retracted position to the front light-emitting position, and is rotated to the bounce light-emitting position.

With reference to FIGS. 19B to 19D and FIGS. 20A to 20C, description will be made of positional relations between the light emitter 40 and the rotation shaft 610a at the retracted position, the front light-emitting position and the bounce light-emitting position. In FIGS. 19B to 19D and FIGS. 20A to 20C, F represents the front side where the camera body 1 has the front face on which the lens mount 2 is provided and which faces toward the object, and R represents the rear side where the camera body 1 has the rear face portion 1b opposite to the front face. In these figures, L1, L2 and L3 represent changes of a position of the rotation shaft 610a in the lens optical axis direction, and K1 represents a position of the fixed shaft 610b.

Figure 20A:
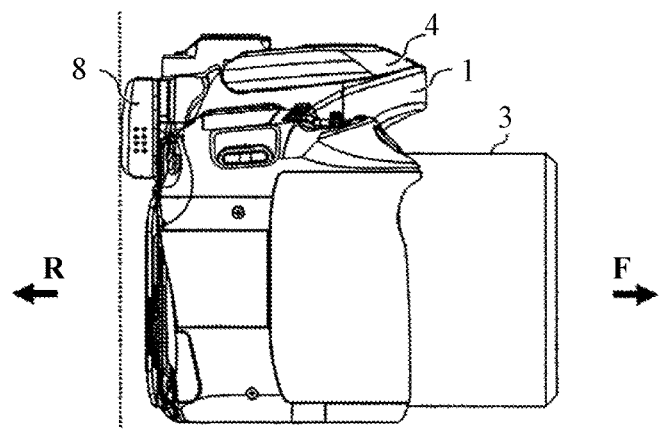
FIGS. 20A, 20B and 20C are side views of the flash unit located at the retracted position, the front light-emitting position and the bounce light-emitting position in Embodiment 3.

At the retracted position illustrated in FIGS. 19B and 20A, the light-emitting panel 403 faces forward and obliquely downward, and is located on the front side F further than the rotation shaft 610a. This position of the rotation shaft 610a is L1 as a first position.

Figure 20B:
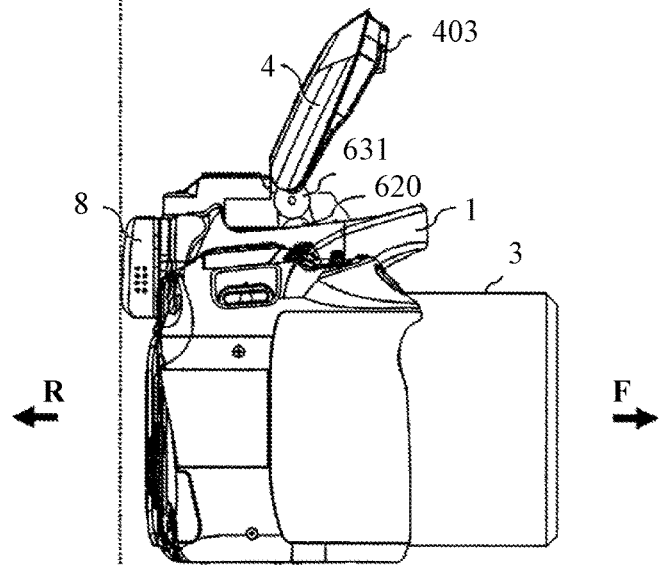

The planetary carrier arm 610 is biased by a pop-up spring (not Illustrated) in an arrow direction in FIG. 19B. As described in Embodiment 1, in response to the release of the lock by the locking hook 15, the flash unit 4 is allowed to be popped up from the retracted position toward the front light-emitting position. When the planetary carrier arm 610 is rotated to the front side F (in a clockwise direction in the figures) by a biasing force of the pop-up spring, the first planetary gear 631 revolves about the sun gear 620 in the clockwise direction while rotating in the same direction. The rotation of the first planetary gear 631 is transmitted to the second planetary gear 632 so as to rotate the second planetary gear 632 in a counter-clockwise direction. Since the second planetary gear 632 is fixed to the flash unit 4, the flash unit 4 is rotated in the counter-clockwise direction opposite to the rotation direction of the planetary carrier arm 610, and thereby is popped up to the front light-emitting position. Similarly, the flash unit 4 is rotated to the bounce light-emitting position. When the flash unit 4 is popped up to the front light-emitting position as illustrated in FIGS. 19C and 20B, the light-emitting panel 403 faces the lens optical axis direction. During the pop-up, the rotation shaft 610a is moved to the front side F from L1 to L2. As in Embodiment 1, the light emitting panel 403 is moved to the front side F further than when the flash unit 4 is popped up with no movement of the rotation shaft 610a. This makes the light projected to the object by the image-capturing lens unit 3 less blocked.

Figure 20C:
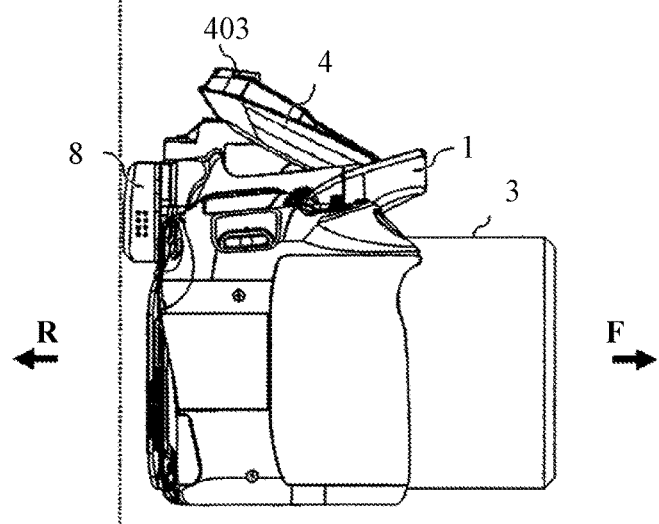

As illustrated in FIG. 19D, when the flash unit 4 is rotated toward the bounce light-emitting position, the rotation shaft 610a is moved to the front side F from L2 to L3. With this rotation, at the bounce light-emitting position the rotation shaft 610a is located on the front side F further than the light-emitting panel 403. As in Embodiment 1, the head portion, which includes the light-emitting panel 403, of the flash unit 4 is rotated to the rear side R, and the rotation shaft 610a is moved to the front side F. This enables reducing the movement amount of the head portion of the flash unit 4 to the rear side R relative to the camera body 1. Therefore, as illustrated in FIGS. 20A to 20C, in addition to at the retracted position and the front light-emitting position, at the bounce light-emitting position the flash unit 4 can be located on the front side F further than the viewfinder (eye-piece window) 8 located at the rearmost end of the rear face portion 1b. This location of the flash unit 4 at the bounce light-emitting position enables, in the state where the user moves his/her face close to the camera body 1 to observe the viewfinder 8, avoiding interference (contact) of the flash unit 4 with the user's face.

Embodiment 4

An image-capturing apparatus disclosed in Japanese Patent Laid-Open No. 2014-006303 provides a spring force (biasing force) to a light-emitting unit through a four-link mechanism so as to cause the light-emitting unit to pop up (rotate) from a retracted position to a front light-emitting position at which its light emitter faces toward an object. In this image-capturing apparatus, a user's operation force provided through his/her finger to the light-emitting unit located at the front light-emitting position rotates it to a bounce light-emitting position at which the light emitter faces upward.

However, when a configuration as disclosed in Japanese Patent Laid-Open No. 2014-006303 in which the spring force causes the light-emitting unit to pop up from the retracted position to the front light-emitting position is used for an image-capturing apparatus allowing a user to select multiple bounce light-emitting positions of the light-emitting unit in response to a user's operation, this spring force may affect the user's operation for selecting the bounce light-emitting positions. That is, the spring force acting in an opposite direction to a direction of the user's operation increases a required operation force, and on the other hand, the spring force acting in the same direction as that of the user's operation decreases the required operation force. This means that the spring force varies the required operation force.

A fourth Embodiment (Embodiment 4) and A fifth embodiment (Embodiment 5) of the present invention each provide an image-capturing apparatus preventing, when a light-emitting unit is popped up from a retracted position by a spring force, the spring force from affecting a user's operation for selecting a position of the light-emitting unit between multiple bounce light-emitting positions. Description will be made of Embodiment 4. Configurations of the camera body 1 and the flash unit 4 in this embodiment are common to those in Embodiment 1 illustrated in FIGS. 1A, 1B, 2, 3 and 4.

This embodiment also uses, as a moving mechanism for the flash unit 4, the four-linkage 7 in which the camera body 1 is the fixed link, the first link member 410 is the driver, the flash unit 4 is the first follower and the second link member 420 is the second follower. The flash unit 4 is rotated by motion of this four-linkage 7. The four-linkage 7 is biased by the pop-up spring 43 through the first link member 410 in the direction in which the flash unit 4 is rotated from the retracted position to the front light-limiting position.

Figure 21:
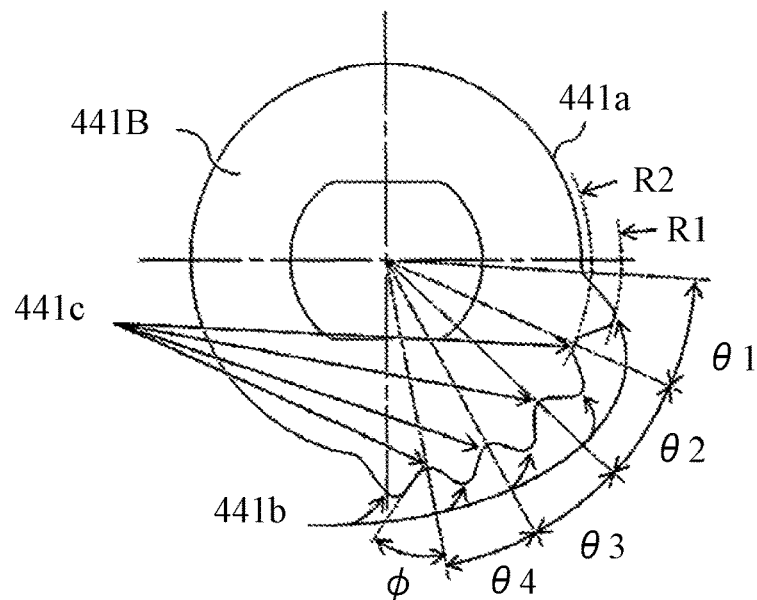
FIG. 21 illustrates a shape of a clicking plate in Embodiment 4 of the present invention.

With reference to FIGS. 4 and 21, description will be made of a configuration of the flash unit 4 in this embodiment. FIG. 4 is an exploded view of the flash unit 4. The flash unit 4 includes the light emitter 40, the flash case 41, the flash cover 42, the pop-up spring (spring member) 43 and the clicking mechanism 44.

The flash case 41 has the hook engaging portion 41a illustrated in FIGS. 3A and 3B, the stopper receiving portion 41b, the first bearing 41c for holding the first rotation shaft 410a and the second bearing 41d for holding the second rotation shaft 420a.

The light emitter 40 includes the light source 401, the reflector 402 and the light-emitting panel 403.

The reflector 402 reflects and collects the flash light emitted from the light source 401 toward the light-emitting panel 403.

The pop-up spring 43 is disposed on (around) the first rotation shaft 410a. The fixed end of the pop-up spring 43 is engaged with the flash case 41, and the movable end thereof is engaged to the first link member 410. In the moving mechanism thus configured using the four-linkage 7 and the pop-up spring 43, the pop-up spring 43 generates the biasing force that biases the first link member 410 in the direction from the retracted position toward the front light-emitting position.

The clicking mechanism 44 includes a clicking plate (fixed member) 441B, the clicking pin (movable member) 442, the clicking biasing spring (biasing member) 443 and the clicking pin holder 444. The clicking plate 441B is disposed around the first rotation shaft 410a and is fixed to the first link member 410. The clicking pin 442 and the clicking biasing spring 443 are held by the clicking pin holder 444, and are fixed to the flash case 41. The clicking pin 442 is movable relative to the flash case 41 and is biased by the clicking biasing spring 443 toward a direction of a center of the clicking plate 441B. FIG. 21 illustrates a shape of the clicking plate 441B. The clicking plate 441B has, in its circumferential direction, an idle running portion 441a, multiple convex portions 441b and multiple concave portions 441c.

The idle running portion 441a does not have a convex and concave shape in a radial direction of the clicking plate 441B, and has a radius at which the clicking pin 442 biased toward the idle running portion 441a does not contact the idle running portion 441a. On the other hand, each of the multiple convex portions 441b generates, by the clicking pin 442 contacting and overriding it while compressing the clicking biasing spring 443, a click feeling in the rotation of the flash unit 4. The multiple concave portions 441c formed between the multiple convex portions 441b can stop the flash unit 4, by the clicking pin 442 dropping (fitting) thereinto, at multiple bounce light-emitting positions where bounce angles are mutually different.

In this embodiment, angular intervals $\theta1$ to $\theta4$ between the concave portions 441c, which correspond to a change pitch of the bounce angle obtained by the motion of the four-linkage 7, are set such that the change pitch is fixed. In other words, the angular intervals $\theta1$ to $\theta4$ are mutually different. The angular intervals $\theta1$ to $\theta4$ can be calculated by, for example, adjusting a radius R2 of an inscribed circle of the concave portion 441c with a radius R1 of a circumscribed circle of the convex portion 441b and an angle $\varphi$ of a slope of the convex portion 441b being fixed.

The configuration of the clicking mechanism 44 in this embodiment is an example of a configuration that improves operability in changing the bounce angle, and does not limit the stop positions of the flash unit 4.

The configuration of the second link mechanism 420 illustrated in FIGS. 6A, 6B and 7 and the lock of the flash unit 4 at the retracted position illustrated in FIGS. 8A to 8C are common to those in this embodiment.

Figure 22:
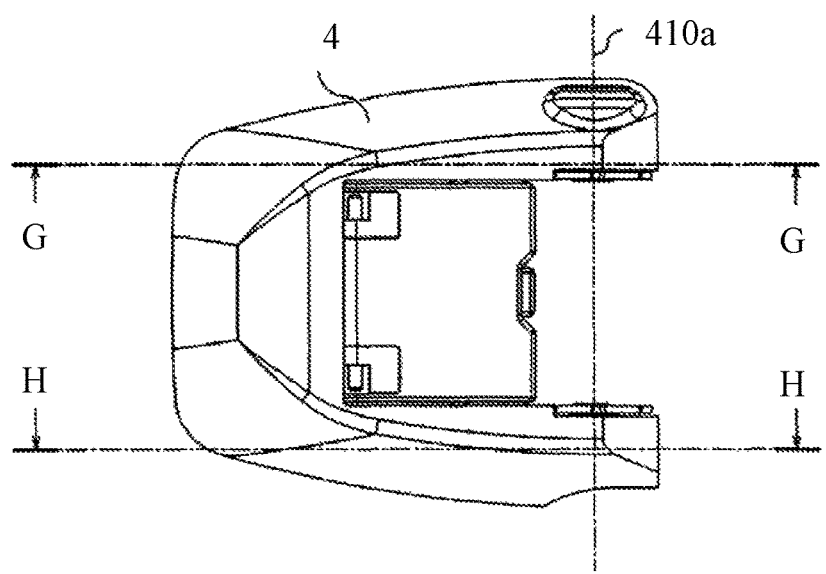
FIG. 22 is a top view of a flash unit in Embodiment 4.

With reference to FIG. 22 and FIGS. 23A to 23J, description will be made of states of the pop-up spring 43 and the clicking mechanism 44. FIG. 22 illustrates the flash unit 4 viewed from its top. FIGS. 23A to 23E illustrate enlarged G-G sections in FIG. 22, which include the first rotation shaft 410a and its surroundings. FIG. 23A illustrates the G-G section at the retracted position, FIG. 23B illustrates the G-G section at the front light-emitting position, FIG. 23C illustrates the G-G section at a first bounce light-emitting position of the multiple bounce light-emitting positions. FIG. 23D illustrates the G-G section at a second bounce light-emitting position of the multiple bounce light-emitting positions, and FIG. 23E illustrates the G-G section at a fifth (final) bounce light-emitting position of the multiple bounce light-emitting positions. On the other hand, FIGS. 23F to 23J are enlarged H-H sections in FIG. 22, which includes the first rotation shaft 410a and its surroundings. FIGS. 23F, 23G, 23H, 23I and 23J illustrate the H-H sections cut at the same positions as those in FIGS. 23A, 23B 23C, 23D and 23E. As illustrated in FIG. 23A, the flash case 41 has a spring stopper portion (movable end holding portion) 41e and a bounce stopper portion 41f. As illustrated in FIG. 23A, at the retracted position, the fixed end 43a of the pop-up spring 43 is engaged with the spring engaging portion (not illustrated) of the flash case 41 as a first member (that is, of the flash unit 4) to be held thereby. On the other hand, the movable end 43b of the pop-up spring 43 is engaged with the spring engaging portion (not illustrated) of the first link member 410 as a second member to be held thereby. With this configuration, the first link member 410 is biased by the biasing force of the pop-up spring 43 in an arrow direction in FIG. 23A.

Furthermore, as illustrated in FIG. 23F, the clicking pin 442 is biased toward the clicking plate 441B by the clicking biasing spring 443. However, the clicking pin 442 facing the idle running portion 441a of the clicking plate 441B does not contact the clicking plate 441B.

The user's operation and the motion of the flash unit 4 and the camera body 1 when the flash image capturing is performed in Embodiment 1 are basically common to those in this embodiment, so that description thereof will be here made also with reference to FIG. 14. The following description will use FIGS. 8A-8C, 9A-9C and 11A-12D illustrating the configurations common to those in this embodiment.

The user turning on the power switch 11 of the camera body 1 at S11 and then determining to perform the flash image capturing at S12 presses at S13 the flash button 13 illustrated in FIG. 1A. In response to receiving, from the switch sensing circuit 104, a signal indicating that the flash button 13 has been pressed, the MPU 100 drives the motor (not illustrated) at S14 to rotate the locking hook 15 in the lock-releasing direction as also illustrated in FIG. 8C. Thereby, the flash unit 4 after retracted position lock is released is popped up by the biasing force of the pop-up spring 43 to the front light-emitting position as illustrated in FIG. 23B. That is, the movable end 43b of the pop-up spring 43 biases the first link member 410 in an arrow direction in FIG. 23B while being held by the spring engaging portion 410c of the first link member 410. During the pop-up, as illustrated by the arrow in FIG. 11A, the stopper portion 421a of the bounce button 421 and the stopper receiving portion 41b of the flash case 41 are rotated about the second rotation shaft 420a in the direction in which they approach each other.

Thereafter, as illustrated in FIG. 11B, the stopper portion 421a contacts the stopper receiving portion 41b (their contact portion is indicated by the bold line in the figure), and thereby the flash unit 4 stops its pop-up at the front light-emitting position illustrated in FIG. 3A.

As described above, this embodiment employs the above-described stopping mechanism in which the flash unit 4 contacts the stopper portion 421a to be stopped at the front light-emitting position, and the releasing mechanism in which the user's operation of the bounce button 421 allows the rotation of the flash unit 4 to the bounce light-emitting position. This configuration enables stopping the flash unit 4 at the front light-emitting position with high positional accuracy.

Furthermore, as illustrated in FIG. 8B, at the retracted position the push portion 421b of the bounce button 421 is covered by the flash cover 42 and thereby is not exposed, so that the user cannot push the push portion 421b.

On the other hand, as illustrated in FIG. 9A, at the front light-emitting position the push position 421b of the bounce button 421 is exposed, so that the user can push the push portion 421b. The bounce button 421 has its role after the flash unit 4 is popped up, that is, the bounce button 421 is not used at the retracted position. Therefore, employing the configuration that the pop-up of the flash unit 4 exposes the bounce button 421 so as to enable the user's operation thereof makes it possible to prevent confusion of the user.

Moreover, in the clicking mechanism 44, as illustrated in FIGS. 9C, 23F and 23G, in order to prevent the clicking plate 441B and the clicking pin 442 from contacting each other, the idle running portion 441a is provided on the clicking plate 441B. In halfway of the pop-up from the retracted position to the front light-emitting position, the click feeling is not necessary. Thus, providing the idle running portion 441a enables preventing, against the pop-up drive by the pop-up spring 43, generation of a resistance due to the contact between the clicking pin 442 and the convex portions 441b. This configuration enables setting the spring force of the pop-up spring 43 to a value appropriate for the pop-up drive of the flash unit 4, without considering an influence of the clicking mechanism 44.

Next, description will be made of the user' operation and the motion of the flash unit 4 when the bounce image capturing is performed, with reference to FIGS. 10A to 10C.

After the flash unit 4 is popped up to the front light-emitting position, the user determining to perform the bounce image capturing at S15 pushes the push portion 421b of the bounce button 421 at S21. In response thereto, at S22, as illustrated in FIG. 11C, the stopper portion 421a slides to the arrow direction in the figure, and thereby the contact of the stopper portion 421a and the stopper receiving portion 41b (that is, the stop of the flash unit 4 at the front light-emitting position) is released. Therefore, as illustrated in FIGS. 10C and 11D, the rotation of the flash unit 4 to the bounce light-emitting position is allowed. The flash unit 4 is rotated by the biasing force of the pop-up unit 43 in the direction of the bounce light-emitting position (that is, toward the multiple bounce light-emitting positions).

Thereafter, as illustrated in FIG. 23H, the clicking pin 442 contacts, at the first bounce light-emitting position, one of the multiple convex portions 441b of the clicking plate 441B, which is the convex portions 441b closest to the idle running portion 441a. Thereby, the rotation of the flash unit 4 is stopped.

When the flash unit 4 is rotated between the multiple bounce light-emitting positions including the position illustrated in FIG. 23H, the movable end 43b of the pop-up spring 43 is engaged with the spring stopper portion 41e provided around the first rotation shaft 410a of the flash case 41 as illustrated in FIG. 23D. That is, the movable end 43b of the pop-up spring 43 is held by the spring stopper portion 41e instead of the spring engaging portion 410c of the first link member 410. This results in a state where both the fixed end 43a and the movable end 43b of the pop-up spring 43 are held. Thus, when the flash unit 4 is rotated between the multiple bounce light-emitting positions (that is, when the bounce angel is changed), the biasing force of the pop-up spring 43 does not act on the first link member 410 and the flash unit 4.

Next, description will be made of a user's operation for changing the bounce angle and motion of the flash unit 4 therefor at S23. When changing the bounce angle from a state where any one of the multiple bounce light-emitting positions, the user manually rotates the flash unit 4 as illustrated by the arrow in FIG. 10C and an arrow in 23I. With the rotation of the flash unit 4, the clicking pin 442 overrides the convex portion 441b adjacent to the concave portion 441c into which the clicking pin 442 has dropped while compressing the clicking biasing spring 443, and then drops into the next concave portion 441c. The clicking pin 442 overriding each of the convex portions 441b generates the click feeling. As described above, when intending to change the bounce angle, the user manually rotates the flash unit 4 to any one of the bounce light-emitting positions while receiving the click feeling, and thereby the flash unit 4 is stopped at the one bounce light-emitting position.

As described above, while the bounce light-emitting position is changed, the biasing force of the pop-up spring 43 does not act on the flash unit 4. However, reaction of the clicking biasing spring 443 compressed when the clicking pin 442 overrides the convex portion 441b becomes a resistance against the rotation of the flash unit 4, so that a user's operation force exceeding the resistance is required.

In other words, for the user performing the rotational operation of the flash unit 4 for changing the bounce light-emitting position, a user's operation force against the resistance generated by the clicking mechanism 44 as a resistance generating mechanism is only necessary, without receiving an influence of the biasing force of the pop-up spring 43. This enables providing a stable operation feeling to the user.

As illustrated in FIG. 23E, when the flash unit 4 is rotated to the final bounce light-emitting position, the spring engaging portion 410c of the first link member 410 contacts the bounce stopper portion 41f of the flash case 41, and thereby a further rotation of the flash unit 4 to the rear side R is prevented. Also at the final bounce light-emitting position, as illustrated in FIG. 23J, the clicking pin 442 drops into the final concave portion 441c of the clicking plate 441B, and thereby the flash unit 4 is held at the final bounce light-emitting position.

In a state where the flash unit 4 is thus stopped at the front light-emitting position or any one of the bounce light-emitting positions, the user determining to cause the flash unit 4 to perform the preliminary light emission at S16 presses at S24 the FE lock button 16 illustrated in FIG. 1B. In response thereto, the MPU 100 causes at S25 the flash unit 4 to perform the preliminary light emission and causes the photometry sensor 83 and the photometry circuit 84 to perform photometry. Then, the MPU 100 calculates the flash light amount in the main light emission depending on the photometry result of the preliminary light emission.

The user determining not to perform the flash image capturing at S12, determining not to perform the preliminary light emission at S16, or determining to perform the preliminary light emission at S16 and then waiting for the preliminary light emission at S25 pushes the shutter button 14 at S30. In response to receiving, from the switch sensing circuit 104, the signal indicating that the shutter button 14 has been pressed, the MPU 100 performs image capturing at S31. In the image capturing, the MPU 100 causes the flash unit 4 to perform the main light emission simultaneously with the image capturing, except when the user has determined not to perform the flash image capturing at S12.

The positional relations between the flash unit 4 and the first rotation shaft 410a at the retracted position, the front light-emitting position and the bounce light-emitting position in this embodiment are common to those illustrated in FIGS. 12A to 12D and FIGS. 13A to 13C.

Embodiment 5

Embodiment 4 described the configuration in which, during the pop-up of the flash unit 4 from the retracted position to the front light-emitting position, the clicking pin 442 does not contact the clicking plate 441B, and thereby the resistance against the pop-up is not generated.

On the other hand, in Embodiment 5, the clicking pin 442 contacts a clicking plate 441C before the front light-emitting position during the pop-up of the flash unit 4, and thereby a braking effect is provided to the pop-up. In this embodiment, constituent elements common to those in Embodiment 4 are denoted by the same reference numeral as those in Embodiment 4, and description thereof is omitted.

Figure 24:
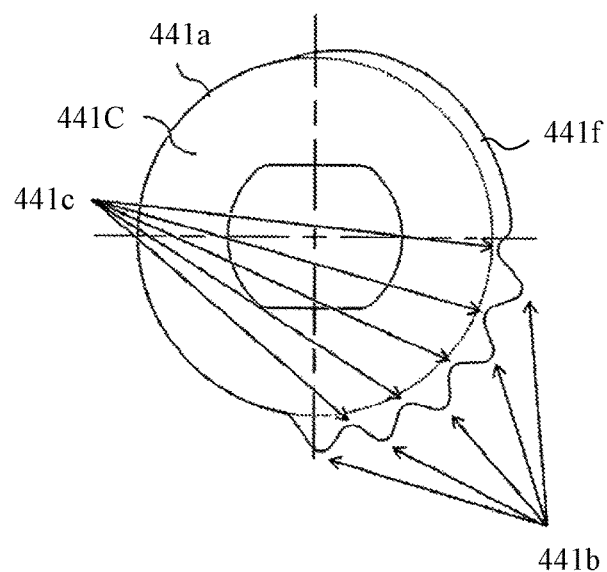
FIG. 24 illustrates a shape of a clicking plate in Embodiment 5 of the present invention.
Figures 25A, 25B, 25C:
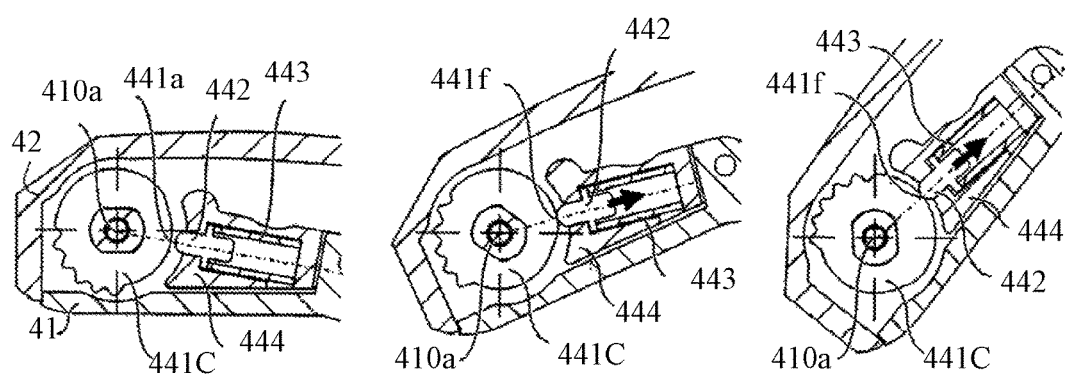
FIGS. 25A to 25C are G-G sectional views of a flash unit rotating from a retracted position to a front light-emitting position.

FIG. 24 illustrates a shape of the clicking plate 441C in this embodiment. The clicking plate 441C has, as in Embodiment 4, the idle running portion 441a and a concave-convex portion including the multiple convex and concave portions 441b and 441c. Furthermore, between the idle running portion 441a and the concave-convex portion, a deceleration portion 441f is provided. The deceleration portion 441f has a shape whose outer diameter continuously increases (that is, which approaches the clicking pin 442) from an idle running portion (441a) side end to a concave portion (441c) side end. The shape of the deceleration portion 441f illustrated in FIG. 24 is merely an example, and other shapes, for example, a shape including a decelerating convex portion where the clicking pin 442 temporarily contacts. FIGS. 25A to 25C illustrate enlarged H-H sections in FIG. 22, which include the first rotation shaft 410a and its surroundings. FIG. 25A illustrates the H-H section at the retracted position, FIG. 25B illustrates the H-H section in half way of the pop-up, and FIG. 25C illustrates the H-H section at a position immediately before the front light-emitting position.

In a first pop-up range from the retracted position illustrated in FIG. 25A to a position in halfway of the pop-up (hereinafter referred to as "a pop-up halfway position"), the clicking pin 442 faces the idle running portion 441a of the clicking plate 441C, and therefore does not contact the clicking plate 441C. Accordingly, in the first pop-up range the resistance against the pop-up of the flash unit 4 is not generated by the clicking mechanism 44.

On the other hand, in a second pop-up range from the pop-up halfway position illustrated in FIG. 25B to the front light-emitting position illustrated in FIG. 25C, the clicking pin 442 contacts the deceleration portion 441f of the clicking plate 441C. The clicking pin 442 contacting the deceleration portion 441f compresses the clicking biasing spring 443 in an arrow direction in FIG. 25B, which increases the biasing force of the clicking biasing spring 443, and thereby increases friction between the clicking pin 442 and the deceleration portion 441f. This friction acts as a resistance (break) on the pop-up.

At a position immediately before the front light-emitting position illustrated in FIG. 25C, the deceleration portion 441f further compresses the clicking biasing spring 443, and thereby a stronger brake acts on the pop-up. This break enables sufficiently decelerating the flash unit 4 immediately before the front light-emitting position. Accordingly, this embodiment enables reducing an impact when the flash unit 4 reaches the front light-emitting position, and enables reducing bounce of the flash unit 4 at the front light-emitting position. Thereby, this embodiment enables shorting a time in which the flash unit 4 becomes stable at the front light-emitting position.

Motion after the flash unit 4 is rotated to the first bounce light-emitting position are identical to those in Embodiment 1.

Embodiment 6

The image-capturing apparatus disclosed in Japanese Patent Laid-Open No. 2014-006303 fails to take measures against a state in which the four-link mechanism is at a change point. A state in which mutually adjacent links in the four-link mechanism are located on an identical straight line is called the change point. This change point makes motion of the four-link mechanism unstable. Therefore, when the front light-emitting position of the light-emitting unit corresponds to the change point, even though the user's operation force is provided to the light-emitting unit toward the bounce light-emitting position, the light-emitting unit may rotate in a direction different from the bounce light-emitting position depending on the direction of the user's operation force.

A sixth embodiment (Embodiment 6) and a seventh embodiment (Embodiment 7) of the present invention each provide an image-capturing apparatus having a light-emitting unit that is popped up by a four-link mechanism and is moved according to a user's intention without stopping at a change point.

Description will be made of Embodiment 6. The configurations of the camera body 1 and the flash unit 4 illustrated in FIGS. 1A, 1B, 2, 3A, 3B and 4 are common to those in this embodiment.

This embodiment also uses, as a moving mechanism for the flash unit 4, the four-linkage 7 in which the camera body 1 is the fixed link, the first link member 410 is the driver, the flash unit 4 is the first follower and the second link member 420 is the second follower. The flash unit 4 is rotated by motion of this four-linkage 7. The four-linkage 7 is biased by the pop-up spring 43 through the first link member 410 in the direction in which the flash unit 4 is rotated from the retracted position to the front light-limiting position.

With reference to FIGS. 26A to 26D, description will be made of a change point of the pop-up mechanism using the four-linkage 7. FIG. 26A illustrates the flash unit 4, the first link member 410 and the second link member 420, which are viewed from their top. FIG. 26B illustrates an M-M section of the flash unit 4, the first link member 410 and the second link member 420 at the front light-emitting position in FIG. 26A. FIG. 26C illustrates another M-M section thereof at the change point. FIG. 26D illustrates yet another M-M section thereof at the bounce light-emitting position. Bold solid lines in FIGS. 26B to 26D schematically express four link elements constituting the four-linkage 7.

At the front light-emitting position illustrated in FIG. 26B and the bounce light-emitting position illustrated in FIG. 26D, the four link elements of the four-linkage 7 are located on mutually different straight lines. In this state, when an external force acts on the flash unit 4 so as to rotate the flash unit 4, a rotation direction of the four-linkage 7 is uniquely defined depending on the external force.

On the other hand, as illustrated in FIG. 26C, when a user's operation force OF acts on the flash unit 4 from a front side (object side) in a state where two link elements as the driver and the first follower are both located on the same straight line, the flash unit 4 can be rotated toward both the front side and a rear side opposite to the front side. Therefore, despite a user's intention to rotate the flash unit 4 from the front light-emitting position illustrated in FIG. 26C to the bounce light-emitting position, the flash unit 4 may be rotated toward the retracted position. Such a state (position) is called the change point of the four-linkage 7.

In this embodiment, the front light-emitting position as a first light-emitting position is located between the retracted position and an intermediate position at which the four-linkage 7 is in the state of the change point, the bounce light-emitting position as a second light-emitting position is located on an opposite side of the front light-emitting position across the intermediate position.

Furthermore, this embodiment uses the clicking plate 441 illustrated in FIG. 5.

The configuration of the second link mechanism 420 illustrated in FIGS. 6 and 7 and the lock of the flash unit 4 at the retracted position illustrated in FIGS. 8A to 8C are common to those in this embodiment. The user's operation and the motion of the flash unit 4 and the camera body 1 when the flash image capturing is performed in Embodiment 1 are basically common to those in this embodiment, so that description will be here made also with reference to FIG. 14. The following description will use FIGS. 8A-8C, 9A-9C and 11A-11D illustrating the configurations common to those in this embodiment. The user turning on the power switch 11 of the camera body 1 at S11 and then determining to perform the flash image capturing at S12 presses at S13 the flash button 13 illustrated in FIG. 1A. In response to receiving, from the switch sensing circuit 104, the signal indicating that the flash button 13 has been presses, the MPU 100 drives the motor (not illustrated) at S14 to rotate the locking hook 15 in the lock-releasing direction as also illustrated in FIG. 8C. Thereby, the flash unit 4 after the retracted position lock is released is popped up by the biasing force of the pop-up spring 43 to the front light-emitting position. During the pop-up, as illustrated by the arrow in FIG. 11A, the stopper portion 421a of the bounce button 421 and the stopper receiving portion 41b of the flash case 41 are rotated about the second rotation shaft 420a in the direction in which they approach each other.

Thereafter, as illustrated in FIG. 11B, the stopper portion 421a contacts the stopper receiving portion 41b (their contact portion is indicated by the bold line in the figure), and thereby the flash unit 4 stops its pop-up at the front light-emitting position illustrated in FIG. 3A.

As described above, this embodiment employs the above-described stopping mechanism in which the flash unit 4 contacts the stopper portion 421a to be stopped at the front light-emitting position, and the releasing mechanism in which the user's operation of the bounce button 421 allows the rotation of the flash unit 4 to the bounce light-emitting position. This configuration enables stopping the flash unit 4 at the front light-emitting position with high positional accuracy.

Furthermore, as illustrated in FIG. 8B, at the retracted position the push portion 421b of the bounce button 421 is covered by the flash cover 42 and thereby is not exposed, so that the user cannot push the push portion 421b. On the other hand, as illustrated in FIG. 9A, at the front light-emitting position the push portion 421b of the bounce button 421 is exposed, so that the user can push the push portion 421b. The bounce button 421 has its role after the flash unit 4 is popped up, that is, the bounce button 421 is not used at the retracted position. Therefore, employing the configuration that the pop-up of the flash unit 4 exposes the bounce button 421 so as to enable the user's operation thereof makes it possible to prevent confusion of the user. Moreover, in the clicking mechanism 44, as illustrated in FIGS. 5 and 9C, in order to prevent the clicking plate 441 and the clicking pin 442 from contacting each other, the idle running portion 441a is provided on the clicking plate 441. In halfway of the pop-up from the retracted position to the front light-emitting position, the click feeling is not necessary. Thus, providing the idle running portion 441a enables preventing, against the pop-up drive by the pop-up spring 43, generation of the resistance due to the contact between the clicking pin 442 and the convex portions 441b. This configuration enables setting the spring force of the pop-up spring 43 to a value appropriate for the pop-up drive of the flash unit 4, without considering an influence of the clicking mechanism 44.

Next, description will be made of the user' operation and the motion of the flash unit 4 when the bounce image capturing is performed. FIG. 10A illustrates the flash unit 4, the first link member 410 and the second link member 420 that are viewed from the front. FIG. 10B and FIG. 10C respectively illustrate D-D and E-E sections thereof in FIG. 10A.

After the flash unit 4 is popped up to the front light-emitting position, the user determining to perform the bounce image capturing at S15 presses the push portion 421b of the bounce button 421 at S21. In response thereto, at S22, as illustrated in FIG. 11C, the stopper portion 421a slides to the arrow direction in the figure, and thereby the contact of the stopper portion 421a and the stopper receiving portion 41b (that is, the stop of the flash unit 4 at the front light-emitting position) is released. Therefore, as illustrated in FIGS. 11D and 10B, the flash unit 4 becomes rotatable to the bounce light-emitting position.

Thus, the flash unit 4 is rotated by the biasing force of the pop-up spring 43 toward the bounce light-emitting position (that is, toward the multiple bounce light-emitting positions).

As illustrated in FIG. 26B, the front light-emitting position is a position before the intermediate position at which the four-linkage 7 is at the change position illustrated in FIG. 26C.

When the flash unit 4 is rotated by a user's manual operation from the front light-emitting position to the bounce light-emitting position illustrated in FIG. 26D, the flash unit 4 passes through the intermediate position. At the intermediate position, the four-linkage 7 receives, from the pop-up spring 43, the biasing force (second biasing force) to the direction of the bounce light-emitting position. That is, the biasing force of the pop-up spring 43 acts on the four-linkage 7 being at the change point toward the bounce light-emitting position. Therefore, it is possible to provide a configuration in which the flash unit 4 does not stop its motion at the intermediate position at which the four-linkage 7 is at the change position. That is, this embodiment does not require a user's operation in the state of the change point, which is an unstable state, and therefore enables the flash unit 4 to be rotated to a direction of the user's operation, (that is, a direction according to a user's intention). Thus, in this embodiment, the first biasing mechanism includes (serves also as) the second biasing mechanism generating the second biasing force.

The clicking pin 442 contacting a side face of the convex portion 441b closest to the idle running portion 441a among the multiple convex portions 441b of the clicking plate 441 stops the rotation of the flash unit 4. This position is a first bounce light-emitting position among the multiple bounce light-emitting position.

Next, description will be made of the user's operation for changing the bounce angle and the motion of the flash unit 4 therefor at S23. When changing the bounce angle from a state where any one of the multiple bounce light-emitting positions, the user manually rotates the flash unit 4 as illustrated by the arrow in FIG. 10C. With the rotation of the flash unit 4, the clicking pin 442 overrides the convex portion 441b adjacent to the concave portion 441c into which the clicking pin 442 has dropped while compressing the clicking biasing spring 443, and then drops into the next concave portion 441c. The clicking pin 442 overriding each of the convex portions 441b generates the click feeling.

As described above, when intending to change the bounce angle, the user manually rotates the flash unit 4 to any one of the bounce light-emitting positions while receiving the click feeling, and thereby the flash unit 4 is stopped at the one bounce light-emitting position.

In the state where the flash unit 4 is stopped at the front light-emitting position or the one bounce light-emitting position, the user determining to cause the flash unit 4 to perform the preliminary light emission at S16 presses at S24 the FE lock button 16 illustrated in FIG. 1B. In response to the press of the FE lock button 16, at S25 the MPU 100 causes the flash unit 4 to perform the preliminary light emission, and causes the photometry sensor 83 and the photometry circuit 84 to perform photometry. Then, the MPU 100 calculates the flash light amount in the main light emission depending on the photometry result of the preliminary light emission.

The user determining not to perform the flash image capturing at S12, determining not to perform the preliminary light emission at S16, or determining to perform the preliminary light emission at S16 and then waiting for the preliminary light emission at S25 presses the shutter button 14 at S30. In response to receiving, from the switch sensing circuit 104, the signal indicating that the shutter button 14 has been pressed, the MPU 100 performs image capturing at S31. In the image capturing, the MPU 100 causes the flash unit 4 to perform the main light emission simultaneously with the image capturing, except when the user has determined not to perform the flash image capturing at S12.

The positional relations between the flash unit 4 and the first rotation shaft 410a at the retracted position, the front light-emitting position and the bounce light-emitting position, which were described with reference to FIGS. 12A to 12D and FIGS. 13A to 13C are common to those in this embodiment.

Embodiment 7

Embodiment 6 described the configuration that the four-linkage 7 passes through the change point by the biasing force of the pop-up spring 43 without stopping threat, and thereby the user's operation is not required at the unstable change point.

Furthermore, Embodiment 1 described the configuration that stops the flash unit 4 at the front light-emitting position using the bounce button 421, and releases the stop in response to the user's operation of the bounce button 421 to enable the rotation of the flash unit 4.

Embodiment 7 will describe a configuration in which a clicking mechanism 44 includes a function of stopping the flash unit 4 at the front light-emitting position without providing the bounce button 421. In this embodiment, constituent elements common to those in Embodiment 1 are denoted by the same reference numeral as those in Embodiment 1, and description thereof is omitted.

Figure 27:
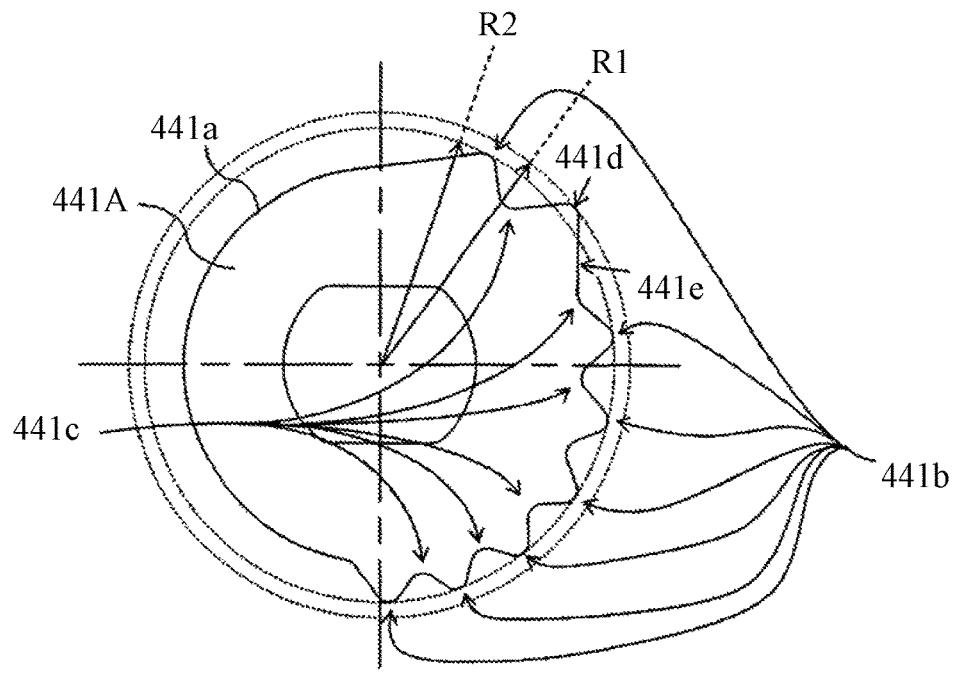
FIG. 27 illustrates a shape of a clicking plate in Embodiment 7 of the present invention.

FIG. 27 illustrates a shape of a clicking plate (fixed member) 441A in this embodiment. The clicking plate 441A is fixed, as in Embodiment 6, to the first link member 410, and includes the idle running portion 441a, the multiple convex portions (second convex portions) 441b and the multiple concave portions 441c. Furthermore, the clicking plate 441A includes a pop-up stopper convex portion 441d as a first convex portion and a slope portion 441e. The slope portion 441e is formed as a side face of the pop-up stopper convex portion 441d.

Figure 28A:
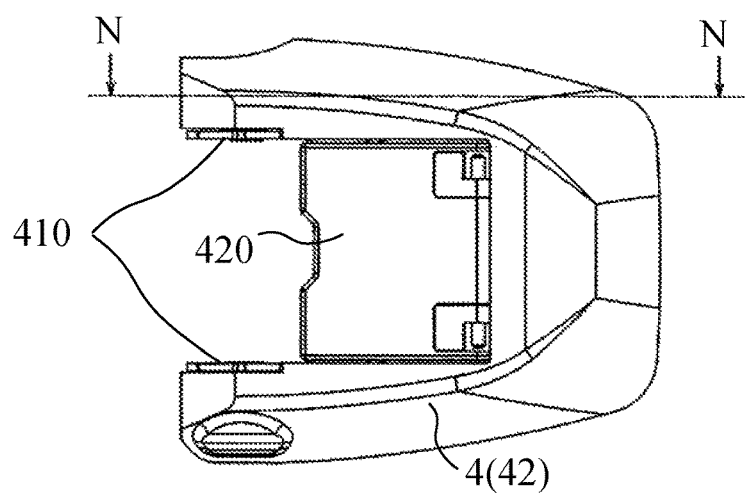
FIG. 28A and FIGS. 28B, 28C and 28D are respectively a top view of a flash unit located at a retracted position and N-N sectional views of the flash unit located at a front light-emitting position, an intermediate position (change point) and a bounce light-emitting position in Embodiment 7 of the present invention.
Figures 28B, 28C, 28D:
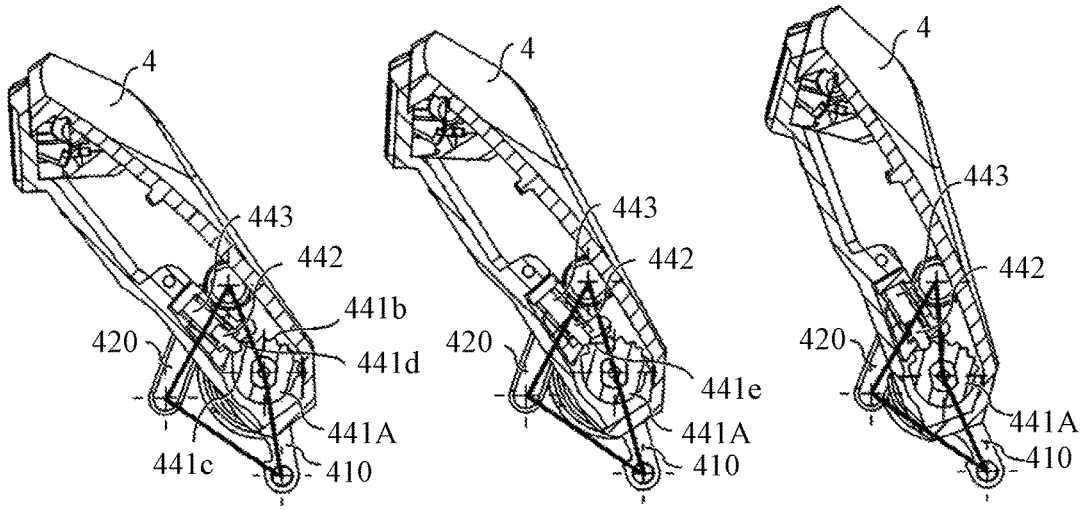
Figure 28E:
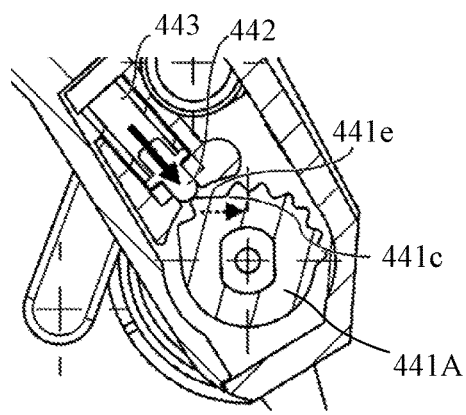
FIG. 28E is an enlarged view of a clicking mechanism in Embodiment 7.

With reference to FIGS. 28A to 28E, description will be made of motion of the clicking mechanism from the retracted position to the bounce light-emitting position. FIG. 28A illustrates the flash unit 4, the first link member 410 and the second link member 420, which are viewed from their top. FIG. 28B illustrates an N-N section of the flash unit 4 located at a front light-emitting position in FIG. 28A. FIG. 28C illustrates an N-N section of the flash unit 4 located at an intermediate position (change point) in FIG. 28A. FIG. 28D illustrates another N-N section of the flash unit 4 located at the bounce light-emitting position. FIG. 28E is an enlarged view of the clicking mechanism illustrated in FIG. 28C.

As illustrated in FIG. 28B, at the front light-emitting position, the clicking pin 442 as a movable member drops into the concave portion 441c, which corresponds to the front light-emitting position, of the clicking plate 441A, and the pop-up stopper convex portion 441d prevents the clicking pin 442 from overriding this pop-up stopper convex portion 441d.

Thereby, a rotation of the clicking plate 441A, that is, of the flash unit 4 toward the bounce light-emitting position is limited.

As illustrated in FIG. 27, a radius R1 of a circumscribed circle of the pop-up stopper convex portion 441d is larger than a radius R2 of a circumscribed circle of the multiple convex portions 441b provided for generating click feelings when the bounce angle of the flash unit 4 is changed. In other words, a height of the pop-up stopper convex portion 441d (including the slope portion 441e) from the first rotation shaft 410a is larger than heights of the other multiple convex portions 441b from the first rotation shaft 410a.

As described above, the pop-up stopper convex portion 441d is provided such that, when the flash unit reaches the front light-emitting position by the biasing force of the pop-up spring 43, the clicking pin 442 does not override the pop-up stopper convex portion 441d. The clicking mechanism 44 thus configured enables reliably stopping the flash unit 4 popped up from the retracted position at the front light-emitting position.

In addition, in Embodiment 6, when the flash unit 4 is rotated from the front light-emitting position to the bounce light-emitting position, the user's operation of the bounce button 421 is required.

On the other hand, in this embodiment, a user's manual rotation of the flash unit 4 from the front light-emitting position toward the bounce light-emitting position causes the clicking pin 442 to override the pop-up stopper convex portion 441*d*, and thereby the flash unit 4 is rotated to the bounce light-emitting position. This enables rotating the flash unit 4 from the front light-emitting position to the bounce light-emitting position with a smaller number of procedures.

Also in this embodiment, when the flash unit is rotated from the front light-emitting position toward the bounce light-emitting position, the flash unit 4 passes the intermediate position at which the four-linkage 7 is at the change point, as illustrated in FIG. 28C. In this embodiment, at this intermediate position, not only the biasing force of the pop-up spring 43 acts on the flash unit 4 to the direction of the bounce light-emitting position as in Embodiment 1, but also the following another biasing force acts thereon. As illustrated in FIG. 28E, at the intermediate position, the clicking pin 442 is press-contacted to the slope portion 441*e* of the clicking plate 441A by the biasing force of the clicking biasing spring (second biasing member) 443. This results in generation of a biasing force (illustrated by a dotted arrow in the figure) that causes the clicking pin 442 to move toward the next concave portion 441*c*, and thereby the flash unit 4 is rotated to the first bounce light-emitting position illustrated in FIG. 28D. That is, this embodiment includes, in addition to the first and second biasing mechanisms using the pop-up spring 43, another second biasing mechanism that the clicking biasing spring (other spring) 443 generates the second biasing force for biasing the flash unit 4 located at the intermediate position toward the bounce light-emitting position.

The above-described configuration can provide a configuration that more reliably prevents the flash unit 4 from stopping its rotation at the intermediate position at which the four-linkage 7 is at the change position. Therefore, this embodiment does not require a user's operation in the state of the change point, which is an unstable state, and thus enables the flash unit 4 to be rotated to the direction according to the user's operation.

This embodiment described the configuration that includes, in addition to the first and second biasing mechanisms using the pop-up spring 43, the other second biasing mechanism using the clicking biasing spring 443. However, a configuration may be employed that includes only the first biasing mechanism using the pop-up spring 43 and the second biasing mechanism using the clicking biasing spring 443.

Motion after the flash unit 4 is rotated to the first bounce light-emitting position is identical to that in Embodiment 6.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application Nos. 2017-004769, 2017-004768 and 2017-004767, filed on Jan. 16, 2017, which are hereby incorporated by reference herein in their entirety.

What is claimed is:

1. An image-capturing apparatus comprising:
a main body;
a light-emitting unit including a light emitter and being movable relative to the main body between a retracted position and a light-emitting position at which the light emitter faces a direction different from an image-capturing direction toward an object; and
a moving mechanism configured to rotate the light-emitting unit about a rotation center axis not parallel to the image-capturing direction to move the light-emitting unit between the retracted position and the light-emitting position,
wherein:
the moving mechanism is configured such that, when the light-emitting unit is located at the retracted position, the light emitter is located on an object side further than the rotation center axis located at a first position relative to the main body, and such that, when the light-emitting unit is located at the light-emitting position, the rotation center axis is located at a second position located on the object side further than the first position; and
the moving mechanism includes a stopper portion provided to stop the rotation center axis at the second position.

2. An image-capturing apparatus according to claim 1, wherein the moving mechanism is configured such that, when the light-emitting unit is located at the light-emitting position, the light emitter is located on an opposite-to-object side further than the rotation center axis located at the second position.

3. An image-capturing apparatus according to claim 1, wherein the moving mechanism is configured such that, when the light-emitting unit is located at the light-emitting position, the light-emitting unit is not located on an opposite-to-object side further than the main body.

4. An image-capturing apparatus according to claim 1, wherein the moving mechanism is configured to be able to move the light-emitting unit to a first light-emitting position at which the light emitter faces the image-capturing direction, and is configured such that, when the light-emitting unit is located at the first light-emitting position, the rotation center axis is located at a third position on the object side further than the first position.

5. An image-capturing apparatus according to claim 4, wherein the second position is a most object-side position between the first, second and third positions.

6. An image-capturing apparatus according to claim 1, wherein the moving mechanism uses a four-link mechanism whose fixed link is the main body and whose follower is the light-emitting unit, and
the rotation center axis is a shaft rotatably connecting a link member as a driver of the four-link mechanism and the light-emitting unit.

7. An image-capturing apparatus according to claim 6, wherein the four-link mechanism includes a link member inside which a cable electrically connecting the light emitter and the main body is disposed.

8. An image-capturing apparatus according to claim 1, wherein the moving mechanism uses a slider-link mechanism including a link member rotatably connected to the light-emitting unit and the main body, and a rail guiding the rotation center axis in a front-rear direction where the front and rear faces are located.

9. An image-capturing apparatus according to claim 1, wherein the moving mechanism uses a planetary gear mechanism including a first gear, a supporting member rotatable about a center axis of the first gear, and a second gear rotatably held by the supporting member and meshing with the first gear, and
the rotation center axis is a shaft rotatably connecting the supporting member and the light-emitting unit.

10. An image-capturing apparatus according to claim 1, wherein:
the moving mechanism includes a spring member and configured to move, by using a biasing force generated by the spring member, the light-emitting unit from the retracted position toward the light-emitting position, the light-emitting position including multiple second light-emitting positions; and
the moving mechanism is configured such that the biasing force does not act on the light-emitting unit when the light-emitting unit is moved between the multiple second light-emitting positions.

11. An image-capturing apparatus according to claim 10, wherein the moving mechanism includes:
a first member holding a fixed end of the spring member; and
a second member holding a movable end of the spring member and configured to, by receiving the biasing force, move the light-emitting unit from the retracted position to a first light-emitting position at which the light emitter faces the image-capturing direction, and
wherein, when the light-emitting unit is moved between the multiple second light-emitting positions, the movable end is held by the first member without being held by the second member.

12. An image-capturing apparatus according to claim 11, wherein:
the first member constitutes part of the light-emitting unit; and
the second member is a link member connected to the main body and the light-emitting unit.

13. An image-capturing apparatus according to claim 12, wherein:
the spring member is disposed around a shaft connecting the link member to the main body; and
the first member is disposed around the shaft and includes a movable end holder holding the movable end.

14. An image-capturing apparatus according to claim 10, further comprising a resistance generating mechanism configured to generate a resistance against a movement of the light-emitting unit when the light-emitting unit is moved between the multiple second light-emitting positions.

15. An image-capturing apparatus according to claim 14, wherein the resistance generating mechanism comprises:
a movable member provided movably relative to the light-emitting unit
a fixed member including multiple convex portions to which the movable member contacts; and
a biasing member generating a biasing force for causing the movable member to contact the multiple convex portions.

16. An image-capturing apparatus according to claim 15, wherein the fixed member includes a decelerating portion that contacts the movable member to decelerate the light-emitting unit when the light-emitting unit is moved from the retracted position to a first light-emitting position at which the light emitter faces the image-capturing direction.

17. An image-capturing apparatus according to claim 1, wherein:
the light-emitting unit is movable to a first light-emitting position at which the light emitter faces the image-capturing direction;
the light-emitting unit is also movable to multiple second light-emitting positions; and
the moving mechanism comprises:
a four-link mechanism whose fixed link is the main body and whose follower is the light-emitting unit; and
a first biasing mechanism configured to provide, to the four-link mechanism, a first biasing force for moving the light-emitting unit from the retracted position to the first light-emitting position, and
wherein:
the first light-emitting position is located between the retracted position and an intermediate position where the four-link mechanism is at a change point;
the second light-emitting position is located on an opposite side of the first light-emitting position across the intermediate position; and
the moving mechanism further comprises a second biasing mechanism configured to provide, to the four-link mechanism, a second biasing force acting in a direction of the second light-emitting position.

18. An image-capturing apparatus according to claim 17, further comprising:
a stopping mechanism configured to stop, at the first light-emitting position, the light-emitting unit moved from the retracted position to the first light-emitting position; and
a releasing mechanism configured to release the stop of the light-emitting unit by the stopping mechanism in response to a user's operation.

19. An image-capturing apparatus according to claim 18, wherein:
the releasing mechanism includes an operation portion where the user's operation is performed; and
the operation portion is provided at a position where the user's operation is allowed when the light-emitting unit is located at the first light-emitting position.

20. An image-capturing apparatus comprising:
a main body;
a light-emitting unit including a light emitter and being movable relative to the main body between a retracted position, a first light-emitting position at which the light emitter faces an image-capturing direction toward an object and a second light-emitting position at which the light emitter faces a direction different from the image-capturing direction; and
a moving mechanism configured to rotate the light-emitting unit about a rotation center axis not parallel to the image-capturing direction to move the light-emitting unit from the retracted position to the first light-emitting position and further to the second light-emitting position,
wherein the moving mechanism is configured such that, when the light-emitting unit is located at the retracted position, the light emitter is located on an object side further than the rotation center axis located at a first position relative to the main body, and such that, when the light-emitting unit is located at the second light-emitting position, the rotation center axis is located at a second position located on the object side further than the first position.

* * * * *